(12) United States Patent
Bursell et al.

(10) Patent No.: US 12,169,553 B2
(45) Date of Patent: Dec. 17, 2024

(54) SECURITY BROKER FOR CONSUMERS OF TEE-PROTECTED SERVICES

(71) Applicant: Red Hat, Inc., Raleigh, NC (US)

(72) Inventors: Michael Hingston McLaughlin Bursell, Farnborough (GB); Lilian Sturmann, Cambridge, MA (US)

(73) Assignee: Red Hat, Inc., Raleigh, NC (US)

( * ) Notice: Subject to any disclaimer, the term of this patent is extended or adjusted under 35 U.S.C. 154(b) by 554 days.

(21) Appl. No.: 17/389,991

(22) Filed: Jul. 30, 2021

(65) Prior Publication Data

US 2023/0030816 A1 Feb. 2, 2023

(51) Int. Cl.
| | |
|---|---|
| *G06F 21/53* | (2013.01) |
| *G06F 21/55* | (2013.01) |
| *G06F 21/56* | (2013.01) |
| *G06F 21/60* | (2013.01) |

(52) U.S. Cl.
CPC ............ *G06F 21/53* (2013.01); *G06F 21/554* (2013.01); *G06F 21/566* (2013.01); *G06F 21/602* (2013.01)

(58) Field of Classification Search
CPC ...... G06F 21/53; G06F 21/554; G06F 21/566; G06F 21/602; G06F 2221/032; G06F 21/57
See application file for complete search history.

(56) References Cited

U.S. PATENT DOCUMENTS

| | | | |
|---|---|---|---|
| 7,587,607 B2 * | 9/2009 | Brickell | ................. G06F 21/57 713/168 |
| 8,140,371 B2 | 3/2012 | Franz et al. | |
| 8,843,997 B1 | 9/2014 | Paul | |
| 9,363,241 B2 | 6/2016 | Deutsch et al. | |

(Continued)

FOREIGN PATENT DOCUMENTS

EP    3483760    5/2019

OTHER PUBLICATIONS

U.S. Appl. No. 17/389,991, InnovationQ+ NPL History (Year: 2023).*

(Continued)

*Primary Examiner* — Samson B Lemma
*Assistant Examiner* — Richard W Cruz-Franqui
(74) *Attorney, Agent, or Firm* — Womble Bond Dickinson (US) LLP

(57) ABSTRACT

The technology disclosed herein enables consumer devices to verify the integrity of services running in trusted execution environments. An example method may include: acquiring, by a broker device, integrity data of a first trusted execution environment of a first computing device and integrity data of a second trusted execution environment of a second computing device, wherein the first trusted execution environment executes a first service and the second trusted execution environment executes a second service; storing the integrity data of the first trusted execution environment and the integrity data of the second trusted (Continued)

execution environment in a data storage device as stored integrity data; correlating integrity data of the first trusted execution environment with the first service and the integrity data of the second trusted execution environment with the second service; and providing, by the broker device, the stored integrity data to a plurality of consumer devices.

20 Claims, 8 Drawing Sheets

(56) References Cited

U.S. PATENT DOCUMENTS

| | | | | |
|---|---|---|---|---|
| 9,832,172 | B2* | 11/2017 | Smith | H04N 21/4627 |
| 9,876,823 | B2* | 1/2018 | Smith | H04L 9/088 |
| 10,055,578 | B1* | 8/2018 | Marquardt | G06F 21/44 |
| 10,248,791 | B2 | 4/2019 | Pappachan et al. | |
| 10,389,756 | B2* | 8/2019 | Smith | G06F 21/6236 |
| 10,547,643 | B2 | 1/2020 | Varley et al. | |
| 10,706,162 | B2 | 7/2020 | Dave et al. | |
| 10,735,397 | B2* | 8/2020 | Ronda | H04L 63/06 |
| 2009/0178138 | A1* | 7/2009 | Weiss | G06F 21/57 726/22 |
| 2011/0010543 | A1* | 1/2011 | Schmidt | H04W 12/06 713/168 |
| 2011/0320823 | A1* | 12/2011 | Saroiu | H04L 9/3247 713/189 |
| 2014/0096182 | A1* | 4/2014 | Smith | H04L 63/0853 726/1 |
| 2014/0283098 | A1* | 9/2014 | Phegade | H04L 63/0428 726/26 |
| 2015/0244616 | A1* | 8/2015 | Nguyen | H04L 45/20 709/242 |
| 2016/0171248 | A1* | 6/2016 | Nesher | G06F 21/53 713/190 |
| 2016/0366180 | A1* | 12/2016 | Smith | H04W 4/70 |
| 2017/0024570 | A1* | 1/2017 | Pappachan | G06F 21/602 |
| 2017/0251025 | A1* | 8/2017 | Varley | H04L 63/0823 |
| 2018/0096412 | A1* | 4/2018 | Scott-Nash | G06Q 30/0635 |
| 2018/0183586 | A1 | 6/2018 | Spantzel et al. | |
| 2018/0254898 | A1* | 9/2018 | Sprague | H04L 9/0637 |
| 2019/0155728 | A1* | 5/2019 | Ferguson | H04L 63/062 |
| 2019/0220601 | A1* | 7/2019 | Sood | G06F 9/505 |
| 2020/0084202 | A1* | 3/2020 | Smith | H04W 12/08 |
| 2020/0142735 | A1* | 5/2020 | Maciocco | H04L 41/0895 |
| 2020/0143044 | A1* | 5/2020 | Bursell | G06F 21/75 |
| 2020/0201679 | A1* | 6/2020 | Wentz | G06F 9/468 |
| 2020/0210585 | A1* | 7/2020 | Thom | G06F 21/71 |
| 2020/0228568 | A1* | 7/2020 | Bursell | G06F 11/3065 |
| 2020/0302043 | A1* | 9/2020 | Vachon | G06F 21/36 |
| 2020/0401695 | A1* | 12/2020 | Mayo | G06F 21/564 |
| 2021/0014113 | A1* | 1/2021 | Guim Bernat | H04L 41/0273 |
| 2021/0021619 | A1* | 1/2021 | Smith | H04L 63/20 |
| 2021/0034423 | A1* | 2/2021 | Hallur | G06F 9/45558 |
| 2021/0111892 | A1* | 4/2021 | Vahldiek-Oberwagner | G06F 21/57 |
| 2021/0117246 | A1* | 4/2021 | Lal | G06F 21/53 |
| 2021/0124629 | A1* | 4/2021 | Beuzit | G06F 16/288 |
| 2021/0194912 | A1* | 6/2021 | Ward | G06F 21/74 |
| 2021/0385069 | A1* | 12/2021 | Reid | G06F 21/32 |
| 2022/0094690 | A1* | 3/2022 | Tarkhanyan | G06F 9/505 |
| 2022/0116755 | A1* | 4/2022 | Filippou | H04W 4/12 |
| 2022/0255916 | A1* | 8/2022 | Smith | H04L 9/3247 |
| 2022/0272106 | A1* | 8/2022 | Wang | H04L 63/126 |
| 2022/0292174 | A1* | 9/2022 | Yan | H04L 63/126 |
| 2022/0294643 | A1* | 9/2022 | Wang | G06F 21/33 |
| 2022/0303123 | A1* | 9/2022 | Cabre | H04L 9/0825 |
| 2022/0309182 | A1* | 9/2022 | Zao | G06F 21/6236 |
| 2022/0321362 | A1* | 10/2022 | Konda | G06F 21/57 |
| 2022/0337611 | A1* | 10/2022 | Brazao | G16Y 20/20 |
| 2022/0377062 | A1* | 11/2022 | Kolodziej | G06F 21/575 |
| 2023/0030816 | A1* | 2/2023 | Bursell | G06F 21/57 |
| 2023/0169397 | A1* | 6/2023 | Smith | G06F 21/57 706/12 |
| 2023/0177138 | A1* | 6/2023 | Alexander | G06F 21/36 726/16 |
| 2023/0185918 | A1* | 6/2023 | Voit | G06F 21/57 726/22 |
| 2023/0216849 | A1* | 7/2023 | Smith | H04L 63/20 726/7 |
| 2023/0297666 | A1* | 9/2023 | Atamli | G06F 21/606 726/23 |
| 2024/0241960 | A1* | 7/2024 | King | G06F 21/57 |

OTHER PUBLICATIONS

NPL Search History (Year: 2024).*
"MarbleRun", https://www.marblerun.sh/docs/introduction/, 88 pages.
Scarlata, et al., "Supporting Third Party Attestation for Intel® SGX with Intel® Data Center Attestation Primitives" Intel corp., https://software.intel.com/content/dam/develop/external/us/en/documents/intel-sgx-support-for-third-party-attestation-801017.pdf, 8 pages.
Matetic, et al., "DELEGATEE: Brokered Delegation Using Trusted Execution Environments", 2018, 20 pages.
Dang, et al., "Fair Marketplace for Secure Outsourced Computations", arXiv, Aug. 29, 2018, 12 pages.
Li, et al., "T-Broker: A Trust-Aware Service Brokering Scheme for Multiple Cloud Collaborative Services", IEEE Transactions on Information Forensics and Security, vol. 10, No. 7, Jul. 2015, 14 pages.
Pires, Rafael Pereira, "Distributed systems and trusted execution environments: Trade-offs and challenges", Universite de Neuchatel, Mar. 11, 2020, https://arxiv.org/pdf/2001.09670.pdf , 133 pages.
Fan, et al., "A Novel Trust Management Framework for Multi-cloud Environments Based on Trust Service Providers", IET Information Security, 2014, https://people.engr.ncsu.edu/hp/papers/Wenjuan2.pdf , 30 pages.
Dushku, et al., "SARA: Secure Asynchronous Remote Attestation for IoT Systems", EEE Transactions on Information Forensics and Security, 2020, https://locard.eu/attachments/article/83/SARA%20Secure%20Asynchronous%20Remote.pdf, 14 pages.
Bandhari R., et al., "Broker Based Secure Web Service Composition Using Star Topology," 2012, 7 Pages, Retrieved from URL: https://ieeexplore.ieee.org/stamp/stamp.jsp?tp=&amnumber=6349493.

* cited by examiner

SECURITY BROKER FOR CONSUMERS OF TEE-PROTECTED SERVICES

TECHNICAL FIELD

The present disclosure generally relates to computer security and confidential computing, and more specifically relates to enabling a consumer device to verify the integrity of services running in Trusted Execution Environments (TEEs).

BACKGROUND

Some computing environments implement a service model where consumers access services that are provided by computers. The services often focus on specific tasks and consumers interact with a specific service to accomplish a specific task. For security reasons, the consumers often have limited access to the computers and are able to access the service interface but not lower level features of the computers. The computing environments often include a variety of mechanisms that can be used to enable the service to trust the consumer but rarely include mechanisms that provide the consumer with the same level of trust of the service.

Modern computing environments have started using Trusted Execution Environments (TEEs) to protect the services and keep the data of the services confidential using encryption. It is common for computing environments to encrypt data when it is stored on disk and when it is in transit. The trusted execution environments now enable the computing environments to encrypt the data of the service while it is in-use by the computers. A trusted execution environment is implemented at a hardware level using the central processing unit (CPU) of the computer. The trusted execution environment encrypts the data of a process that provides the service while the data is in memory and in use by the CPU. The encryption can occur at a firmware level and can be set up so that the cryptographic keys are inaccessible to any and all operating system processes executing on the computer.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
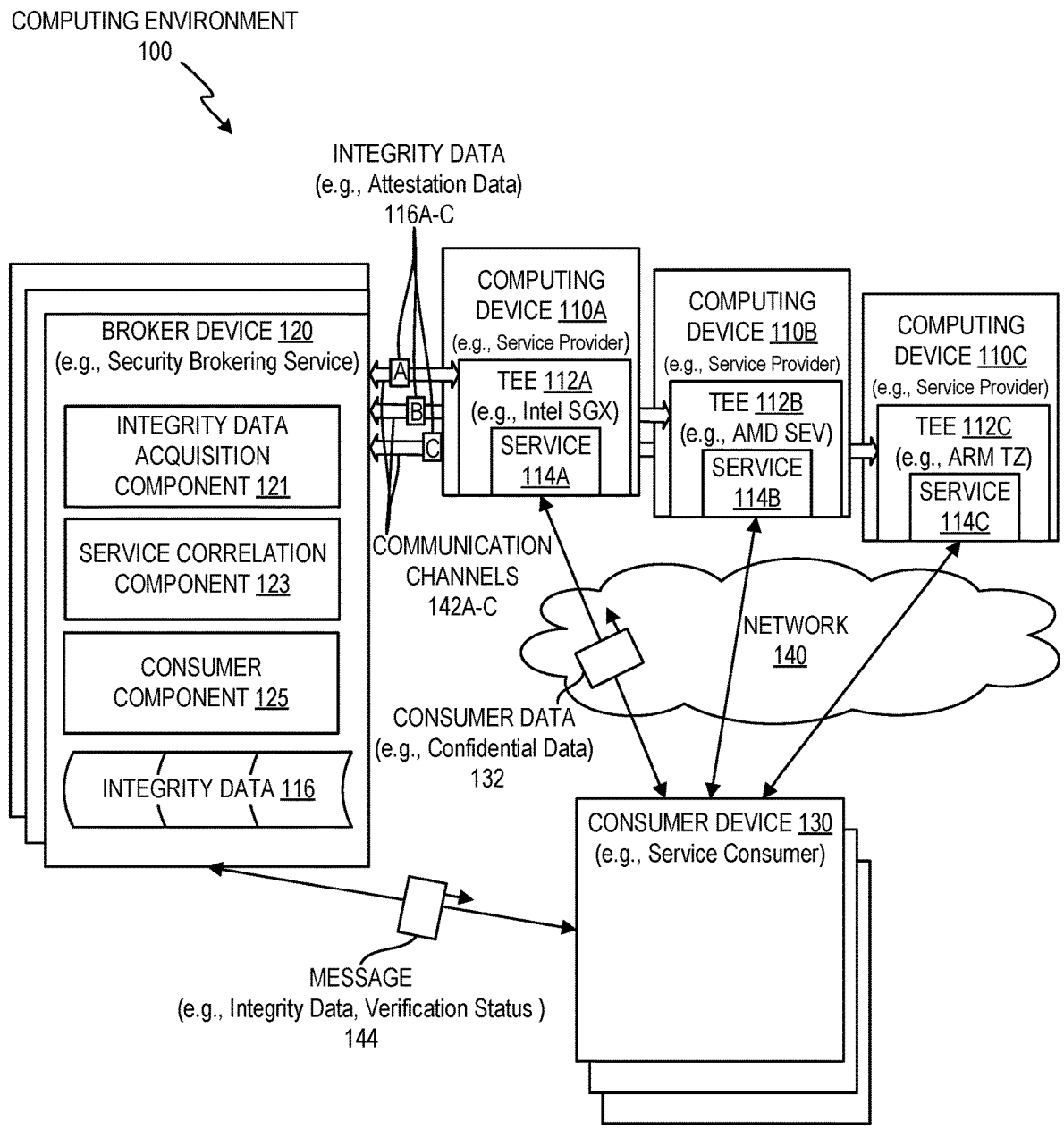
FIG. 1 depicts a high-level block diagram of an example computing environment that includes a broker device that enables one or more consumer devices to verify that services are being executed in trusted execution environments, in accordance with one or more aspects of the present disclosure.

Computing devices that support trusted execution environments often provide a technique that enables programs to verify the integrity of the trusted execution environment. The technique may be useful for a program that intends to provide confidential data to a service running in the trusted execution environment and wants to minimize the ability of other programs on the computing device from accessing the confidential data. The technique for verifying the integrity of the trusted execution environment may involve accessing low level information about the hardware of the computing device (e.g., hardware type, architecture, model, firmware, security version). This level of access to the hardware of the computing device is often heavily restricted and may be available to computing devices within a trusted network but is rarely provided to consumer devices over the internet. As a result, the consumer devices may be unable to verify that a service is executing in a trusted execution environment.

Aspects of the present disclosure address the above and other deficiencies by providing broker devices that can enable consumer devices to verify the integrity of services executing in trusted execution environments. A broker device can access and store integrity data that can be used to verify that a particular service is executing in a trusted execution environment. The integrity data may include information derived from the computing device that is hosting the trusted execution environment. In one example, the integrity data may include one or more hashes, cryptographic keys, device information, other data, or a combination thereof. The broker device may have access to the computing device and may be able to interact with one or more processors (e.g., CPUs) of the computing device to perform a technique for verifying the integrity of the trusted execution environment. The technique may be the same or similar to remote attestation and may enable the broker device to acquire integrity data that is specific to one or more different types of trusted execution environments. The different types of trusted execution environments may be based on the different microprocessor technology, such as, Software Guard Extensions™ (SGX) by Intel®, Secure Encrypted Virtualization™ (SEV) by AMD®, TrustZone™ (TZ) by ARM®, Secure Execution™ by IBM®, Trusted Domain Extensions™ (TDX) by Intel, other technology, or a combination thereof.

The integrity data can be stored by the broker device and subsequently used to enable consumer devices to verify that one or more services are running in trusted execution environments. The verification can be performed by the broker device, by the consumer device, by another device, or a combination thereof. In one example, the consumer device may establish a trust relationship with the broker device and the broker device may perform the verification check of the service using the integrity data. The broker device can then indicate to the consumer device that the service satisfies the verification check. In another example, the consumer device may implement a zero-trust security model and may not trust the broker device. The broker device may provide the integrity data to the consumer device and the consumer device may perform the verification check of the service using the integrity data. In the latter example, the same integrity data can be provided to different consumer devices that are using or are planning to use the same service. The integrity data of different services can be provided together to the one or more consumer devices. For example, there may be a set services (e.g., service mesh) and the integrity data for the different services can be combined and provided together to enable the consumer devices to verify the set of services more efficiently.

The broker device may acquire the integrity data using a pull technique or a push technique. The pull technique may involve the broker device initiating the acquisition of the integrity data from the computing devices that are executing the services in the trusted execution environments. The pull technique may occur when the broker device is functioning as a proxy for consumer devices. The consumer devices may have insufficient access to initiate the acquisition of the integrity data and may rely on the broker device to initiate the acquisition. The push technique may be similar to the pull technique but may involve another device initiating the acquisition of the integrity data to the broker device. The push technique may occur when the broker device is associated with a registration service and the computing device hosting a service in a trusted execution environment may provide the integrity data during a registration process. In either of these examples, the integrity data may be acquired by a set of one or more broker devices.

The set of broker devices may be organized into a hierarchical topology to handle a large number of services and a large number of consumer devices. The hierarchical topology may include a tree topology, a star topology, a bus topology, or a ring topology. Each broker device in the set may correspond to a specific group of services (e.g., service mesh A, service mesh B), a specific geographic location (e.g., Boston, New York, San Francisco), a specific type of Trusted Execution Environment (TEE) (e.g., SGX, SEV, TrustZone), other attributes, or a combination thereof.

The technology described herein improves the field of computer security by enhancing the use of Confidential Computing (e.g., Trusted Computing). The technology enhances confidential computing by using broker devices to extend confidential computing from a set of computing devices that provide services to the computing devices that consume the services (e.g., consumer devices). In particular, the technology enhances the availability, usability, and performance of trusted execution environments. As discussed above, consumer devices often have restricted access to the computing devices providing the services and are unaware or unable to verify that the services are executing in a trusted execution environment. The broker device extends the availability of confidential computing so that the consumer devices can verify that consumer data is being protected in a manner that complies with confidential computing. This can be done without requiring the service to include logic for accessing, providing, or managing the integrity data. The service may be unaware it is executing in a trusted execution environment and the broker device can acquire and share the integrity data without the participation of the service.

The technology may also make confidential computing more useable for consumer devices by providing a single contact point for verifying the integrity of many different services (e.g., 100s or 1000s of services). The consumer device may contact a single broker device and if the broker device is absent the integrity data for a particular service the consumer device or broker device can acquire the integrity data from another broker device. The broker devices can also or alternatively provide a common interface that enables the consumer devices to access integrity data for trusted execution environments that are implemented on different hardware platforms (e.g., hardware agnostic interface common across SGX, SEV, and TrustZone).

The technology may also or alternatively improve the performance of running services in trusted execution environments. The performance may be improved by reducing the number of times a computing device provides the integrity data for a trusted execution environment. For example, the integrity data for the service running in a trusted execution environment may be provided to the broker device and the broker device may use the same integrity data to enable verification by multiple consumer devices (e.g., 100s or 1000s of consumer devices). This reduces computing resources consumed by the computing device providing the service (e.g., reduced network bandwidth, processing cycles, memory use). The performance of the verification process may also be enhanced by having the broker device combine the integrity data of a set of multiple services so that the set of services can be verified together.

Various aspects of the above referenced methods and systems are described in details herein below by way of examples, rather than by way of limitation. The examples provided below discuss a broker device that is separate from the computing devices providing the services and the consuming devices consuming the services. In other examples, the broker device features may be included in a security brokering service that can execute on the computing devices providing the services, on the consumer devices consuming the services, other devices, or a combination thereof.

FIG. 1 depicts an illustrative architecture of elements of a computing environment 100, in accordance with an example of the present disclosure. It should be noted that other architectures for computing environment 100 are possible, and that the implementation of a computing environment utilizing embodiments of the disclosure are not necessarily limited to the specific architecture depicted. Computing environment 100 may provide an infrastructure for verifying the integrity of computing devices and may be referred to or function as a verification infrastructure (e.g., attestation infrastructure, integrity infrastructure, zero-trust infrastructure). Computing environment 100 may include a cloud computing system. In one example, the computing devices providing the services may be hosted in the cloud computing system and the services may be consumed by consumer devices at the edge of a network (e.g., edge computing scenario, hybrid cloud scenario). In another example, the computing devices may be in the cloud computing system or at the edge and may provide services to consumer devices that are accessible over the internet (e.g., Internet of Things (IoT) scenario, Personal Computing Scenario). Many other scenarios are available as discussed below. As shown in the example of FIG. 1, computing environment 100 may include one or more computing devices 110A-C, broker devices 120, consumer devices 130, and a network 140.

Computing devices 110A-C may include any computing devices that are capable of providing at least one service to one or more consumer devices. Computing devices 110A-C may be referred to as "service devices" "provider devices" or "service providing devices." Computing devices 110A-C can be or include one or more servers, workstations, personal computers (e.g., desktop computers, laptop computers), mobile computers (e.g., mobile phones, palm-sized computing devices, tablet computers, personal digital assistants (PDAs)), network devices (e.g., routers, switches, access points), other devices, or a combination thereof. In one example, computing devices 110A-C may be part of a cloud computing system (e.g., public cloud, private cloud, hybrid cloud), an on-premise computing system (e.g., company server), or other system.

Computing devices 110A-C may be configured to support one or more levels of virtualization for executing the services. The virtualization levels may include hardware level virtualization (e.g., Virtual Machines (VMs)), operating system level virtualization (e.g., Containers), or other virtualization, as discussed in more detail below in regards to FIG. 2. Computing devices 110A-C may include one or more hardware platforms with processors based on x86, PowerPC®, SPARC®, ARM®, other hardware architecture, or a combination thereof. Each of computing devices 110A-C may include a combination of hardware and programing (e.g., Trusted Computing Base (TCB) that supports Confidential Computing (CC) (e.g., Trusted Computing (TC)) and can establish one or more trusted execution environments 112A-C.

Trusted execution environments 112A-C (TEEs) may protect data using techniques that enhance data confidentiality, data integrity, data availability, or a combination thereof. Trusted execution environments 112A-C may protect the data using hardware based encryption that isolates the data of a service (e.g., VM, container, process, or web application) while it is in use by a processor and protects the data from other processes running on the same computing device. In one example, the data of a process executing in the trusted execution environment may be encrypted using cryptographic keys that are accessible to a hardware processor of the computing device but are inaccessible to all the processes running on the computing device (e.g., hardware level encryption). The hardware processor may encrypt or decrypt the data of the process executing in the trusted execution environment when the process stores or accesses the data. This enables the trusted execution environment to isolate data of a lower privileged process (e.g., application process or virtual machine process) executing within the trusted execution environment from being accessed by a higher privileged processes (e.g., kernel or hypervisor) even though the higher privileged processes may be responsible for managing the lower privileged process. Trusted execution environments 112A-C may provide code execution, storage confidentiality, and integrity protection, and may store, execute, and isolate data of a service from other processes executing on the same computing device, as discussed in more detail in regards to FIGS. 3-4.

Services 114A-C may be any computing service that can be executed by a computing device in a trusted execution environment and may perform a computing task. Each service may include one or more computing processes and may be an instance of a computer program that may contain executable data (e.g., code) and non-executable data (e.g., activity information) of the computer program. The service and its one or more computing processes may execute as part of one or more virtual machines, containers, or other execution constructs, as discussed below in regards to FIG. 2. Services 114A-C may be different services (e.g., different computer programs) or may each be the same service and provide access to the same data or different data (e.g., same computer program but different data set).

Services 114A-C may communicate with one another, with consumer device 130, or a combination thereof. Services 114A-C may appear to a consumer device as a single service, as a set of independent services, or as a set of interconnected services. The set of services may be a referred to as microservices, a service mesh, composite service, aggregate service, combined service, other term, or a combination thereof. Services 114A-C may share a common architecture that may be the same or similar to Service Oriented Architecture (SOA), Microservice Architecture (MSA), Open Service Mesh (OSM), other architecture, or a combination thereof. In one example, a first service (e.g., service 114A) may communicate with a second service (e.g., service 114B) to satisfy a request of a consumer device. In another example, a first service (e.g., service 114A) may communicate data to consumer device 130 and consumer device 130 may provide the data of the first service to a second service (e.g., service 114B) to satisfy a request of the consumer.

The computing tasks provided by services 114A-C may vary depending on the computing environment 100. For example, services 114A-C may perform computing tasks for data storage (e.g., database, filesystem), data streaming (e.g., video streaming, audio streaming), messaging (e.g., email, instant message, text), authentication (e.g., directory service, active directory, LDAP), executable code retrieval (e.g., image repository, code repository), data transformation (encoding/decoding, encryption/decryption), transactions (e.g., reservation booking, payments), artificial intelligence (e.g., computer vision, language translation, recommendation system, expert systems), machine learning tasks (e.g., inference, training, data gathering, validating, labeling, augmenting, annotating), other tasks, or a combination thereof.

Services 114A-C may provide a computer program interface that enables one or more consumer devices 130 to communicate with one or more of services 114A-C. The computer program interface may be the same or similar to an Application Programming Interface (API), a web interface (e.g., Web API), a remote interface (e.g., Remote API, Remote Procedure Call (RPC), Remote Method Invocation (RMI)), other interface, or a combination thereof. The computer program interface can enable device-to-device interaction using messages that are based on or are the same or similar to Hyper Text Transfer Protocol (HTTP), Representational State Transfer protocol (REST), Simple Object Access Protocol (SOAP), other protocol, or a combination thereof. The messages may include non-textual data (e.g., non-human readable binary data) or textual data (e.g., human readable) in the form Extensible Markup Language (XML), JavaScript Object Notation (JSON), ASCII, Unicode (UTF), other data encoding format, or a combination thereof. The computer program interface may provide interface points (e.g., end points) that indicate where or how services 114A-C can be accessed by one or more consumer devices 130.

Consumer device 130 may be a computing device that consumes one or more of the services 114A-C provided by computing devices 110A-C. Consumer device 130 may be the same or similar to computing devices 110A-C (e.g., mobile device, personal computer (PC), server, etc). A consumer device may be associated with a particular user, client, or service and may be referred to as a user device, client device, service consumption device, or other term. In one example, consumer device 130 may be an edge device that provides edge computing at the edge of a network (e.g., Internet Service Provider (ISP) server), on-premise computing at a location of consumers (e.g., on-premise server), or other location. In another example, the consumer device may be accessible over the internet and may be Internet of Things (IoT) devices that are included in autonomous vehicles (e.g. automobiles, drones), appliances (e.g., refrigerators, microwaves, laundry machine, smart speaker), wearables (e.g., smart watches, clothing), access control devices (e.g., entrance, garage door), environment sensors (e.g., thermostat, motion detector, smart speaker/microphone), other device, or a combination thereof.

Consumer device 130 may consume the services by transmitting data to the service, receiving data from the service, or a combination thereof. In one example, the data transmitted to the service may be consumer data 132. Consumer data 132 may be any data related to a consumer and may include privacy data, sensitive data, confidential data, secret data, classified data, other data, or a combination thereof. The data may be transmitted or received over network 140 using one or more communication channels (unlabeled). The communication channels between consumer device 130 and computing devices 110A-C may provide restricted network access that enables consumer device 130 to receive data of a service (e.g., service data) from computing devices 110A-C without enabling the consumer device 130 to receive integrity data from computing devices 110A-C. As a result, consumer device 130 may be unable to directly verify the integrity of the trusted execution environment and may use broker device 120 to indirectly verify the integrity of trusted execution environments 112A-C and services 114A-C.

Broker device 120 may be a computing device that is capable of acquiring and storing data that can be used to verify the integrity of a service executing in a trusted execution environment. Any computing device that is providing some or all of the features discussed below or running a Security Brokering Service (SBS) may be considered a "broker device." For example, a management server, orchestration server, provisioning server, deployment server, or other server may be running the security brokering service and may therefore be considered a broker devices even though they may be performing one or more other server functions. Broker device 120 may be the same or similar to computing devices 110 (server, PC, mobile device) and may located in a cloud computing system (e.g., cloud device), on-premise (e.g., on-premise device), edge computing system (e.g., edge device), or other location. The security brokering service may be executed by broker device 120 using a trusted execution environment or without using a trusted execution environment.

As shown in FIG. 1, the broker device 120 or security brokering service may include an integrity data acquisition component 121, service correlation component 123, and consumer component 125. Integrity data acquisition component 121 may enable broker device 120 to acquire and store integrity data of each of the computing devices 110A-C (e.g., integrity data 116A-C). The integrity data may be acquired directly from the computing devices or indirectly from another broker device that has access to the computing devices. Service correlation component 123 may enable broker device 120 to correlate the integrity data of one or more computing devices with the respective one or more services 114A-C. Integrity data 116A-C may be from different computing devices and may be combined by broker device 120 before, during, or after it is stored. Consumer component 125 may enable broker device 120 to provide integrity data derived from computing devices 110A-C together or separately to one or more consumer devices 130 using one or more messages 144. The same integrity data may be provided multiple times to one or more consumer devices and may be provided at a time that is much later then when it was acquired (e.g., hours, days, or months later). Components 121, 123, and 125 are discussed in more detail in regards to FIG. 2.

Integrity data 116A-C includes integrity data received by broker device 120 from each of the computing devices 110A-C (e.g., received integrity data). Integrity data may be based on the configuration of the computing device and may represent the capabilities of a hardware platform, a trusted execution environment, executable code, or a combination thereof. Integrity data obtained or generated by the hardware platform of a computing device (e.g., processor, memory controller, firmware, BIOS) may be the same or similar to hash data (e.g., hash, digital signature), identification data (e.g., processor model or security version, cryptographic data (e.g., certificates, authentication keys, signature keys, endorsement keys, session keys, encryption or decryption keys), measurement data (e.g., Quote data, report data), configuration data (e.g., program version, hardware version, firmware version, security version, settings, registry data), other data, or a combination thereof.

In one example, generating the integrity data may involve hashing integrity data of one or more different portions of the computing device using a hashing function (e.g. cryptographic hashing function). The hashing may involve performing one or more hashes using the same hash function or different hash functions. The hashing may involve a hash chain that provides the output of a first hash function as input to a second hash function. The first and second hash functions may be the same or different hash functions. In one example, integrity data may be generated by generating or obtaining integrity data of one or more layers of the computing device 110 and the layers may correspond to hardware device layer (e.g., hardware platform integrity data), program layer (e.g, code integrity data), other layer, or a combination thereof.

Integrity data 116 may be integrity data that is stored by broker device 120 (e.g., stored integrity data). The stored integrity data 116 may be based on (e.g., derived from, combination of) integrity data of one or more computing devices 110A-C, integrity data of one or more broker devices 120, or a combination thereof. In one example, stored integrity data 116 may be a combination that includes a stored version of all the integrity data 116A-C that broker device 120 receives from one or more computing devices 110A-C. The stored version of the integrity data may be the same (e.g., bit for bit identical) or substantially similar (e.g., more than 90% identical) to the version of the integrity data that was received from the computing devices. For example, stored integrity data 116 may be in a format that is the same or similar to a native format generated by the hardware platform of the computing device (e.g., Intel SGX, AMD SEV, ARM TrustZone). In this example, the stored integrity data 116 may be referred to as raw integrity data, native integrity data, original integrity data, or other term. As discussed above, each of the computing devices may have a different type of hardware platform so the stored integrity data may include integrity data with multiple different formats. In another example, integrity data 116 may be a combination of integrity data that is based on the received integrity data but may have a different format (e.g., a common format)

The common format may be one of the native formats (e.g., specific format), may be a non-native format (e.g., generic format), or a combination thereof. In one example, the common format may be a native format and when the computing devices provide integrity data with the same particular native format, the broker device may combine the data using particular native format. When broker device 120 receives the majority of the integrity data in a particular native format and other integrity data in one or more other native formats, broker device 120 may use the particular native format (e.g., more common native format) as the common native format and convert the other native formats into the particular native format. In another example, broker device 120 may convert the received integrity data into a non-native format (e.g., generic format) independent of the native format of the received integrity data. The non-native format may be a standardized format or a proprietary format that is different from some or all of the native formats of the hardware platforms.

Communication channels 142A-C may include any communication channel that is capable of communicating integrity data between computing devices 110A-C and one or more broker devices 120. The connections may be based on network connections, computer-to-computer connections, peripheral connections, inter process connections, other connections, or a combination thereof. The network connections may be over the same network or different networks and each of the network connections may be an indirect connection that traverses one or more network nodes (e.g., access points, switches, routers, or other networking infrastructure device) and may communicably couple one of computing devices with one or more other computing devices (e.g., VPN network connection). A computer-to-computer connection may be the same or similar to a peer-to-peer connection and may be a direct connection between computing devices (e.g., bluetooth connection, WiFi Direct, ad-hoc network connection). A peripheral connection may be a connection that uses a direct physical connection between an adapter of the computer and an adapter of the portable data storage device (e.g., Universal Serial Bus (USB) connection). The peripheral connection may exist when one of the computing devices is a computer and the other is a portable data storage device (e.g., USB drive, key fob, secure card). The inter process connection may enable processes on the same computing devices or different computing devices (e.g., physical machines or virtual machines) to communicate with one another using any form of inter process communication (e.g., message passing, shared memory, memory mapped file, message queue, socket, pipe, trap).

Network 140 may be a public network (e.g., the internet), a private network (e.g., a local area network (LAN) or wide area network (WAN)), or a combination thereof. In one example, network 140 may include a wired or a wireless infrastructure, which may be provided by one or more wireless communications systems, such as a wireless fidelity (WiFi) hotspot connected with the network 140 and/or a wireless carrier system that can be implemented using various data processing equipment, communication towers, etc.

Figure 2:
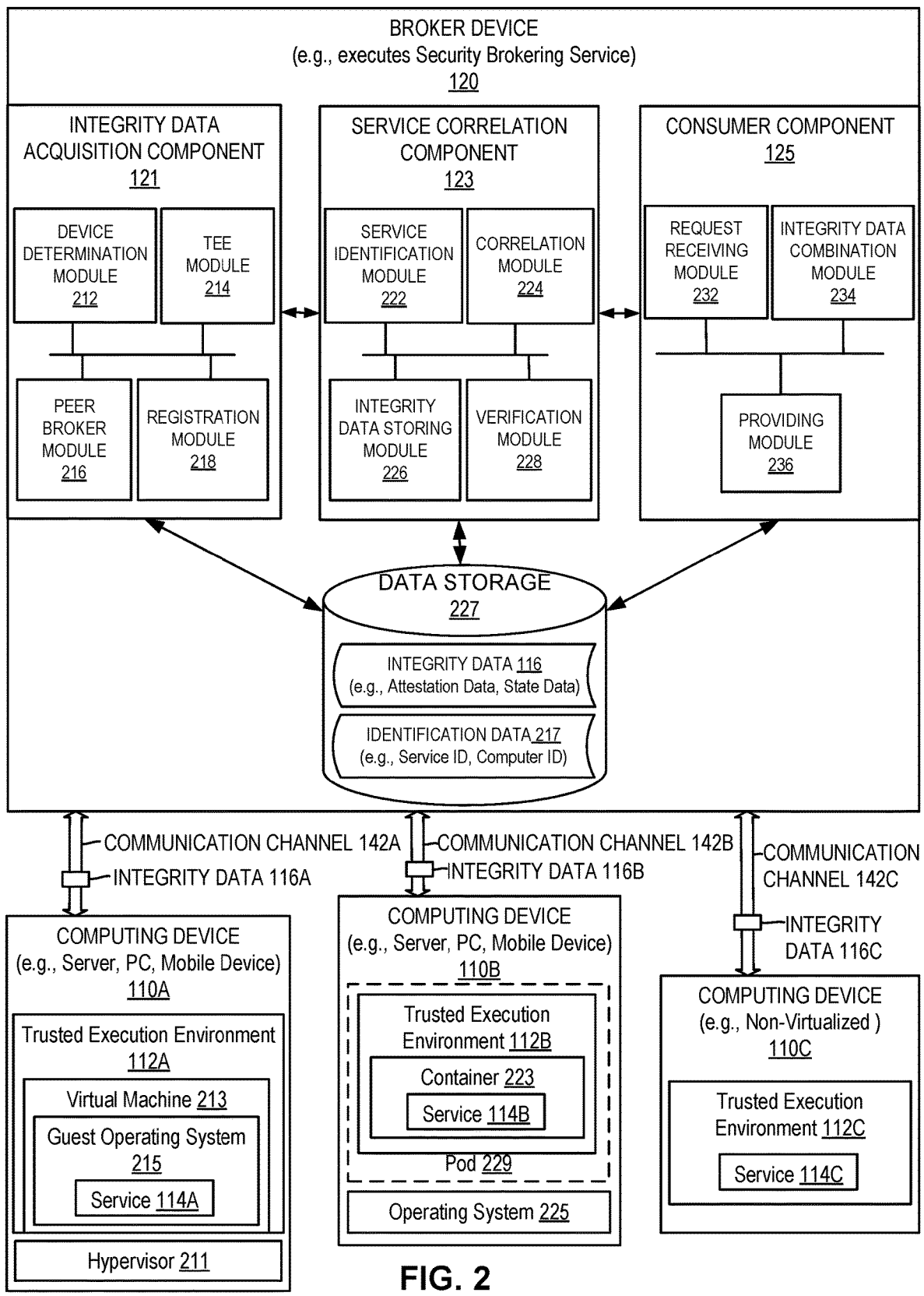
FIG. 2 depicts a block diagram of an example broker device that executes a security brokering service, in accordance with one or more aspects of the present disclosure.

FIG. 2 depicts a block diagram illustrating an exemplary broker device 120 that can acquire integrity data of one or more computing devices 110A-C and share integrity data with one or more consumer devices, in accordance with one or more aspects of the present disclosure. Broker device 120 may be the same or similar to broker device of FIG. 1 and may execute a Security Brokering Service (SBS) that includes an integrity data acquisition component 121, a service correlation component 123, a consumer component 125, and data storage 227. The features of the components and modules of FIG. 2 may be implemented as hardware logic (e.g., integrated circuits), programing logic (e.g., executable code), other logic, or a combination thereof. The hardware logic may be included in one or more central processing units (e.g., x86, ARM, Power CPUs), secure cryptoprocessors (e.g., Hardware Security Module (HSM), Trusted Platform Module (TPM)), memory controllers, other processors, or a combination thereof. The programming logic may be included as executable code in device firmware, device drivers, kernels, hypervisors, container runtimes, operating systems, applications, other programs, or a combination thereof. More or less components or modules may be included without loss of generality. For example, two or more of the components may be combined into a single component, or features of a component may be divided into two or more components. In one implementation, one or more of the features of the components may execute on different computing devices (e.g., the broker device, consumer device, service providing device).

Integrity data acquisition component 121 may enable broker device 120 to initiate the acquisition of integrity data for each of the computing devices 110A-C. Broker device 120 may initiate the acquisition of integrity data 116A-C and get it directly from computing devices 110A-C as shown in FIG. 2 (e.g., direct acquisition) or get it indirectly from one or more broker devices that received integrity data from respective computing devices 110A-C (e.g., indirect acquisition). In one example, integrity data acquisition component 121 may include a device determination module 212, TEE module 214, a peer broker module 216, and a registration module 218.

Device determination module 212 may enable broker device 120 to determine which of the computing devices in computing environment 100 are executing the service and are responsible for generating the integrity data. If the service is already running on a computing device, device determination module 212 may use identification data 217 to identify the computing device. This may involve device determination module 212 performing an internal look-up that is local to broker device 120 (e.g., check local index or cache) or an external lookup by communicating with a remote device (e.g., management, orchestration, or provisioning server). If the service is not running, device determination module 212 may enable broker device 120 to initiate the start of the service by transmitting a request (e.g., deployment request). In one example, broker device 120 may identify the executable data of the service (e.g., dormant program, container image, or virtual machine image) and select a computing device to execute the executable data (e.g., select device to execute the program, container or virtual machine). In another example, broker device 120 may transmit the request to a management device (e.g., provisioning server) and the management device may cause the executable data to execute on a computing device. The management device may provide the identification data of the computing device to broker device 120. In either example, the service may be executed in a trusted execution environment of the computing device and device determination module 212 may store data to identify the computing device as identification data 217 or update the previously stored identification data 217 (e.g., update to indicate service and/or computing device).

TEE module 214 may enable broker device 120 to directly acquire integrity data from the determined computing device executing the service in the trusted execution environment. TEE module 214 may enable broker device to initiate a remote integrity check of the computing device executing the service by transmitting a request for integrity data to the computing device (e.g., verification request). The broker device may receive integrity data of the trusted execution environment from the computing device. In one example, the remote integrity check may be the same or similar to local attestation, remote attestation, direct anonymous attestation (DAA), or a combination thereof and the received integrity data may be referred to as attestation data. The attestation data may be generated by processors of computing devices 110A-C.

Peer broker module 216 may enable broker device 120 to indirectly acquire the integrity data from one or more other broker devices. Peer broker module 216 may check broker device 120 (e.g., local broker device) before attempting to acquire the integrity data from another broker device (e.g., remote broker device). The check may involve one or more check operations that include a storage check, a communication check, another check, or a combination thereof. The storage check may determine whether the integrity data is stored by broker device 120 on a local storage device (e.g., local hard drive or solid state drive) or a remote storage device (e.g., network storage). The communication check may determine whether broker device 120 has access to the computing device (e.g., a communication channel) that would enable it to request the integrity data via TEE module 214. If the storage check and communication check indicate broker device 120 cannot acquire the integrity data, peer broker module 216 may communicate with a peer broker device.

The peer broker may be another broker device in a set of broker devices that may be organized in a hierarchical topology. The hierarchical topology may have any arrangement and may include a tree topology, a star topology, a bus topology, or a ring topology, other topology, or a combination thereof. Each broker device in the set may correspond to a specific set of services (e.g., service mesh A), a specific cloud provider (e.g., IBM Cloud, Google Cloud, Amazon Web Services (AWS), Microsoft Azure, Alibaba Cloud, Salesforce.com), a specific organizational entity (company web servers, private cloud), a specific geographic location (e.g., rack, room, building, campus, city, state, region, country, continent), operating system (e.g., Linux, Unix, Microsoft Windows™, Apple Mac™, Apple iOS™, Android™), or a specific type of Trusted Execution Environment (TEE) (e.g., type of hardware platform). The types of TEE may include a first type with TEEs using Secure Encrypted Virtualization (SEV), a second type with TEEs using Software Guard Extensions (SGX), a third type with TEEs using a TrustZone.

Peer broker module 216 may enable broker device 120 to select one of the other broker devices in the set and communicate with it to indirectly acquire the integrity data. In one example, peer broker module 216 may have a default broker device (e.g., predefined gateway broker) that is selected when broker device 120 is unable to directly acquire the integrity data. Peer broker module 216 may communicate with another peer broker module of the default broker device. If the default broker device is unable to acquire the integrity date, the other peer broker module may communicate with one or more other broker devices until the integrity data is acquired or an error occurs indicating the integrity data is unavailable to the set of broker devices.

In another example, peer broker module 216 may select a broker device from the set based on information about the service (e.g., service identifier), trusted execution environment (e.g., type of TEE), computing device (e.g., location, IP address, device domain, operating system), consumer device (e.g., user identifier, network address), other information, or a combination thereof. The information may be derived from identification information 217 and used to identify a broker device in the set that is able to provide the integrity data. In other examples, the selection may also or alternatively be based on a load balancing technique (e.g., select least loaded peer broker), an affinity technique (e.g., select broker device that previously acquired integrity data successfully), random technique (e.g., randomly select a broker device in the set), other technique, or a combination thereof.

Registration module 218 may enable broker device 120 to acquire integrity data from a computing device during a registration operation. The registration operation may be initiated by services 114A-C, trusted execution environments 112A-C, computing devices 110A-C, a consumer device, a broker device, an agent, or a combination thereof. The agent may execute within the trusted execution environment of the service and monitor the service as discussed in more detail in regards to FIG. 4. The registration operation may involve registration module 218 receiving a message (e.g., registration message or registration request) from one or more of computing devices 110A-C before, during, or after the service begins executing (e.g., in response to service starting). The message may include or indicate availability of integrity data, identification data, other data, or a combination thereof. The identification data may include data that broker device 120 can use to uniquely identify the service, computing device, trusted execution environment, or agent, and may be subsequently stored as identification data 217 and used by service correlation component 123.

Service correlation component 123 may enable broker device 120 to correlate the integrity data with one or more services before, during, or after the integrity data is stored by broker device 120. The integrity data may be absent data that clearly identifies a particular service and the broker device 120 may perform a series of operations to correlate the integrity data with one or more particular services (e.g., a particular set of services). In some situations, the service may be identified by broker device 120 before the integrity data is acquired and in other situations the integrity data may be acquired by the broker device 120 before the service is identified. The later situation may arise when the broker device 120 acquires integrity data for one or more computing devices before the computing devices begin executing the services. In the example shown in FIG. 2, service correlation component 123 may include a service identification module 222, correlation module 224, an integrity data storing module 226, and a verification module 228.

Service identification module 222 may enable broker device 120 to identify the one or more services that are associated with the integrity data. Broker device 120 may identify the service based on data received from the consumer device (e.g., in a verification request), data received from the computing device or service or (e.g., in a registration request), data received from another broker device (e.g., acquisition fulfillment), other data, or a combination thereof.

Service identification module 222 may then store or update identification data 217 with data identifying the service.

Correlation module 224 may enable broker device 120 to correlate services 114A-C and integrity data 116A-C before, during, or after storing data in data storage 227. The correlations may be stored as one or more links, maps, indexes, identifiers, references, other data or data structures, or a combination thereof. The correlation may be a unidirectional correlation that correlates services to integrity data or integrity data to services. The correlation could alternatively be a bidirectional correlation that correlates services to integrity data and integrity data to services. There may be a one to many relationship or a many to one relationship. For example, the same service may correlate to different integrity data because the service may execute in more than one trusted execution environment and on more than one computing device. Conversely, the same integrity data may correlate to many different services. This may occur because the integrity data may be combined integrity data of a set of services executing on different computing devices or because a trusted execution environment can execute multiple different services.

Integrity data storing module 226 may enable broker device 120 to store integrity data. Storing the integrity data may involve storing the integrity data in data storage 227, which may be a non-persistent storage device (e.g., main memory), in a persistent storage device (e.g., HDD, SDD, NAS, SAN), or a combination thereof. The storage devices may be internal or external to broker device 120. Integrity data storing module 226 may store the received integrity data (e.g., integrity data 116A-C), the combined integrity data (e.g., integrity data 116), or other data. Integrity data storing module 226 may perform one or more operations before, during, or after storing the integrity data. The operations may include operations for encrypting, decrypting, encoding, decoding, signing, hashing, formatting, transforming, modifying, combining, other operation, or a combination thereof as discussed in more detail below in regards to component 234. For example, integrity data storing module 226 may receive encrypted integrity data and may decrypt and then encrypt the integrity data using a different key (e.g., re-encryption).

Verification module 228 may enable broker device 120 to verify the integrity of a service, trusted execution environment, and/or computing device using stored integrity data 116. The verifying may be referred to as a verification, an integrity check, verification check, appraisal, platform authentication, or other term. The verifying may involve executing one or more verification functions. The verification functions may be executed by broker device 120, by consumer device 130, other device, or a combination thereof.

The verification functions may take as input the integrity data and provide output that indicates whether the service is verified (e.g., trusted). In one example, the integrity data may include hash data (e.g., certificate chain) and the verification function may analyze a portion of hash data to generate validation data. The verification function may then compare the received integrity data with the generated validation data to perform the integrity check or verification check (e.g., compare received hash with a generated hash).

Consumer component 125 may enable broker device 120 to communicate with one or more consumer devices and enable the consumer devices to verify that the services are executing in trusted execution environments. A consumer device may be any computing device that is associated with a service, which includes computing devices already consuming the service, attempting to consume the service, or planning to consume the service. In one example, consumer component 125 may include a request receiving module 232, an integrity data combination module 234, and a providing module 236.

Request receiving module 232 may enable broker device 120 to receive requests for one or more consumer devices. Each request may be a request to verify the integrity of services or computing devices and the requests may be referred to as verification requests, integrity check requests, consumer requests, or other term. In one example, the consumer device may generate a verification request and transmit the verification request to broker device 120. In another example, the computing device providing the service may transmit (e.g., forwarded) a verification request for the consumer device or on behalf of the consumer device to the broker device 120. The forwarded verification request may be based on a request the consumer device sent to the service. For example, the computing device can forward the consumer request to the broker device 120 or generate a new request based on the consumer request and send the new request to the broker device 120.

Each request may include one or more request messages that may include identification data associated with the service that enables broker device 120 to identify a particular service. The identification data of the request may include data that identifies one or more services (e.g., service names or identifiers), computing devices (e.g., service providing device names), consumer devices (e.g., consumer device name), network interfaces (e.g., IP addresses, port number, MAC addresses, or other network address), resource locators (e.g., Universal Resource Locator (URL), users (e.g., user name, account number), other data, or a combination thereof.

Broker device 120 may receive the request for the integrity data before, during, or after the broker device has acquired the integrity data. In one example, broker device 120 may receive the request from the consumer device after acquiring the requested integrity data (e.g., cached from earlier request or previously registered). In another example, broker device 120 may receive the request from the consumer device and acquire the requested integrity data in response to receiving the request (e.g., on behalf of the consumer device). In yet another example, broker device 120 may be unable to acquire the integrity data and may transmit the request to another broker device. The other broker device may send the integrity data back to broker device 120, directly to the consumer device, or a combination thereof.

Integrity data combination module 234 may enable broker device 120 to generate combined integrity data 116. Combined integrity data 116 may be based on integrity data of computing devices 110A-C, integrity data of broker device 120 (e.g., certificate), or a combination thereof. Combining integrity data may involve one or more operations that include hashing, chaining, joining, merging, incorporating, blending, unifying, constructing, appending, linking, concatenating, truncating, filtering, mixing, excluding, adding, removing, fusing, coalescing, other operation, or a combination thereof. In one example, correlation module 224 may generate combined integrity data 116 by combining integrity data 116A, integrity data 116B, and integrity data 116C into one or more data structures (e.g., hash chain, certificate, file, record, blob, chunk, data stream, hash, cryptographic key, bit string). In another example, correlation module 224 may generate combined integrity data 116 by combining integrity data 116 or one of integrity data 116A-C with integrity data of broker device 120 (e.g., certificate) into one or more data structures. In either example, combined integrity data 116 may be combined by broker device 120 before, during, or after it is accessed by integrity data storing module 226.

Integrity data combination module 234 may be advantageous because it may enable integrity data of multiple services or devices to be provided together to a consumer device. Providing the integrity data together may involve providing the data in the same data exchange unit (e.g., communication unit). The data exchange unit may be provided over network 140 or a bus and may be a session (e.g., TCP session, HTTP session, login session), message, packet, frame, segment, signal, other information exchange, or a combination thereof.

Providing module 236 may enable broker device 120 to provide integrity data to one or more consumer devices. Broker device 120 may provide integrity data by transmitting one or more messages that include the integrity data to the consumer device or by storing the integrity data in a location that is accessible to the consumer device and transmitting a message to indicate it has been stored (e.g., message may or may not identify the location if it's known).

Broker device 120 may provide the integrity data to a consumer device before, during, or after the consumer device initiates communication with the service. In one example, broker device 120 and consumer device may communicate before the consumer device communicates with the service. This may enable the consumer device to verify the integrity of the service before transmitting a message to the service (e.g., service request), which may include consumer data (e.g., private or confidential data). In another example, broker device 120 and consumer device may communicate after the consumer device communicates with service. This may enable the consumer device to obtain data from the service (e.g., identification data, state data, integrity data) that can be used to identify the broker device 120 and/or to provide to broker device 120 to assist in the acquisition and verification of the integrity data. In yet another example, broker device 120 and consumer device may communicate while the consumer device is communicating with the service. This may enhance performance by enabling the consumer device to verify the service while the service request is being processed (e.g., parallel processing of service request and verification request).

Providing module 236 may provide previously stored integrity data to a plurality of consumer devices. The stored integrity data may include the integrity data of one or more services and be provided to a consumer device as multiple separate units of integrity data or as a single unit of integrity data (e.g., combined integrity data). The same units of integrity data may be provided multiple times to one or more consumer devices and may be provided at a time that is much later then the time broker device 120 acquired it (e.g., X minutes, hours, days, or months later).

Providing module 236 may provide stored integrity data to consumer devices without the consumer devices requesting the integrity data from any of the broker devices. In the example discussed above, the consumer device may transmit a service request to the service and an intermediate device (e.g., proxy device) may send a generated verification request or forward the original service request to broker device 120. Broker device 120 may provide the consumer device with the corresponding integrity data even though the consumer device did not send the verification request. In another example, each time the stored integrity data is updated, the broker device 120 may provide the updated integrity data to one or more of the consumer devices that had been provided the older integrity data.

Computing devices 110A-C may be the same or similar to computing device 110A-C of FIG. 1 and illustrate virtualization features of computing devices 110A-C. In the example shown in FIG. 2, computing device 110A-C may include devices that support one or more levels of virtualization for executing services 114A-C and the levels may include hardware level virtualization, operating system level virtualization, other virtualization, or a combination thereof. The hardware level virtualization may involve a hypervisor (e.g., virtual machine monitor) that emulates portions of a physical system and manages one or more virtual machines that each include an operating system to provide a service. In contrast, operating system level virtualization may include a single operating system that manages one or more isolated virtual containers. Each virtual container (i.e., container) may provide a service and share the kernel of the underlying operating system without requiring its own kernel.

Computing device 110A is an example of a computing device that provides hardware level virtualization. Computing device 110A may execute a hypervisor 211 that manages hardware resources for one or more virtual machines 213. Virtual machine 213 may be executed in or by a trusted execution environment 112A. Hypervisor 211 may be any program or combination of programs and may run directly on the hardware (e.g., bare-metal hypervisor) or may run on or within a host operating system (not shown). The hypervisor may be the same as a virtual machine monitor and may manage and monitor various aspects of the operations of the computing device, including the storage, memory, and network interfaces. The hypervisor may abstract the physical layer hardware features such as processors, memory, and I/O devices, and present this abstraction as virtual devices to a virtual machine 213 executing a guest operating system 215.

Guest operating system 215 may be any program or combination of programs that are capable of managing computing resources of virtual machine 213 and/or computing device 110A. Guest operating system 215 may include a kernel comprising one or more kernel space programs (e.g., memory driver, network driver, file system driver) for interacting with virtual hardware devices or physical hardware devices. In one example, guest operating system 215 may include Linux®, Solaris®, Microsoft Windows®, Apple Mac®, other operating system, or a combination thereof. Service 114A may be a program that is executed as a kernel module or device driver (e.g., kernel process, system process) in guest operating system 215 or as an application (e.g., user process, application process) that is managed by guest operating system 215

Computing device 110B may be similar to computing device 110A and may also or alternatively provide operating system level virtualization by running a computer program that provides computing resources to one or more containers 223. Operating system level virtualization may be implemented within the kernel of operating system 225 (e.g., host operating system or guest operating system) and may enable the existence of multiple isolated containers. In one example, operating system level virtualization may not require hardware support and may impose little to no overhead because programs within each of the containers may use the system calls of the same underlying operating system 225. This may enable computing device 110B to provide virtualization without the need to provide hardware emulation or be run in a virtual machine (e.g., intermediate layer) as may occur with hardware level virtualization.

Operating system level virtualization may provide resource management features that isolate or limit the impact of one container (e.g., container 223) on the resources of another container.

The operating system level virtualization may provide a pool of computing resources that are accessible by container 223 and are isolated from one or more other containers. The pool of resources may include file system resources (e.g., particular file system state), network resources (e.g., particular network interfaces, sockets, addresses, or ports), memory resources (e.g., particular memory portions), other computing resources, or a combination thereof. The operating system level virtualization may also limit (e.g., isolate) a container's access to one or more computing resources by monitoring the container's activity and restricting the activity in view of one or more limits. The limits may restrict the rate of the activity, the aggregate amount of the activity, or a combination thereof. The limits may include one or more of file system limits, disk limits, input/out (I/O) limits, memory limits, CPU limits, network limits, other limits, or a combination thereof.

Operating system 225 may include an operating system virtualizer that may provide containers with access to computing resources. The operating system virtualizer may wrap one or more processes (e.g., of a particular service) in a complete file system that contains the code, runtime, system tools, system libraries, and other data present on the node (e.g., a particular file system state) that can be used by the processes executing within the container. In one example, the operating system virtualizer may be the same or similar to Docker® for Linux® or Windows®, ThinApp® by VMWare®, Solaris Zones® by Oracle®, other program, or a combination thereof. In one example, the operating system virtualization may support and automate the packaging, deployment, and execution of applications inside containers (e.g., Open Shift®).

Each container 223 may refer to a resource-constrained process space of computing device 110B that can execute functionality of the program data. Container 223 may be referred to as user-space instances, virtualization engines (VE), or jails and may appear to a user as a standalone instance of the user space of operating system 225. Each container 223 may share the same kernel but may be constrained to use only a defined set of computing resources (e.g., CPU, memory, I/O). Aspects of the disclosure can create one or more containers to host a framework or provide other functionality of a service (e.g., web application functionality, database functionality) and may therefore be referred to as "service containers" or "application containers." Container 223 may execute service 114B as one or more processes (e.g., user space processes or application processes) and the container 223 and service 114B may execute in trusted execution environment 112.

Pod 229 may be a data structure that is used to organize one or more containers 223 and enhance sharing between the containers, which may reduce the level of isolation between containers within the same pod. Each pod may include one or more containers that share some computing resources with another container associated with the pod. Each pod may be associated with a unique identifier, which may be a networking address (e.g., IP address), that allows applications to use ports without a risk of conflict. A pod may be associated with a pool of resources and may define a volume, such as a local disk directory or a network disk and may expose the volume to one or more (e.g., all) of the containers within the pod. In one example, all of the containers associated with a particular pod may be co-located on the same computing device 110B. In another example, the containers associated with a particular pod may be located on different computing devices that are on the same or different physical machines. In either example, the containers within a pod can execute the same service (e.g., service 114B) or one or more different services (e.g., services 114A-C).

Computing device 110C may be absent hardware virtualization and operating system level virtualization. Computing device 110C but may provide service 114C by executing service 114C as one or more processes in trusted execution environment 112C. The example discussed below in regards to FIG. 3 may appear similar to computing device 110C because it does not illustrate the hardware virtualization and operating system level virtualization to make the discussion easier.

Figure 3:
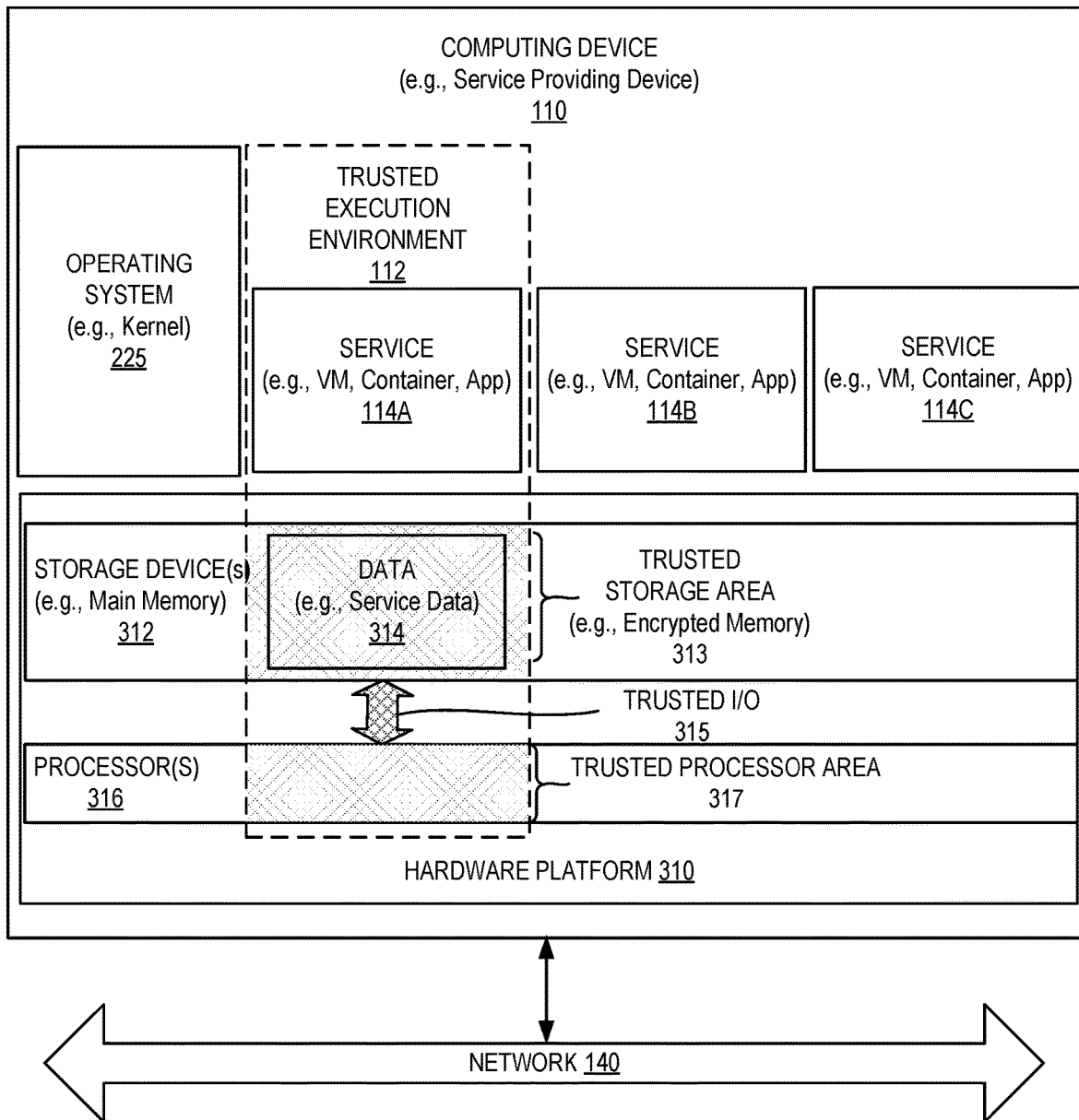
FIG. 3 depicts a block diagram of an example computing device that includes a trusted execution environment for executing a service, in accordance with one or more aspects of the present disclosure.

FIG. 3 depicts an example of a trusted execution environment 112 established in computing device 110, in accordance with an embodiment of the present disclosure. Computing device 110 and trusted execution environment 112 may be the same or similar to one or more of the respective computing devices 110A-C and trusted execution environments 112A-C of FIGS. 1-2. In the example of FIG. 3, computing device 110 may include a hardware platform 310, a trusted execution environment 112, an operating system 225, one or more services 114A-C, and a network 140. It should be noted that other architectures for computing device 110 are possible, and that the implementations of the computing device utilizing embodiments of the disclosure are not necessarily limited to the specific architecture depicted.

Hardware platform 310 may include one or more hardware devices that perform computing tasks for computing device 110. Hardware platform 310 may include one or more data storage devices, computer processors, Basic Input Output services (BIOS), code (e.g., firmware), other aspects, or a combination thereof. One or more devices of the hardware platform 310 may be combined or consolidated into one or more physical devices or may partially or completely emulated as a virtual device or virtual machine. Hardware platform 310 may provide a Trusted Computing Base (TCB) that can be used to establish a trusted execution environment 112. In the example in FIG. 2, hardware platform 310 may include one or more storage devices 312 and processors 316.

Storage devices 312 may include any data storage device that is capable of storing data and may include physical memory devices. The physical memory devices may include volatile memory devices (e.g., RAM, DRAM, SRAM), non-volatile memory devices (e.g., NVRAM, ROM), other types of memory devices, or a combination thereof. Storage devices 312 may also or alternatively include mass storage devices, such as hard drives (e.g., Hard Disk Drives (HDD)), solid-state storage (e.g., Solid State Drives (SSD)), other persistent data storage, or a combination thereof. Storage devices 312 may be capable of storing data 314 associated with one or more of the services 114A-C. In one example, data of service 114A may be received from a device that is internal or external to computing device 110. As discussed in FIG. 4, the data may be encrypted using a cryptographic key that was provided (e.g., determined, derived, generated, assigned) by computing device 110 or by a different computing device. The received data may be decrypted using the same cryptographic key or a derivative of the cryptographic key and the decrypted data may be loaded into the trusted execution environment 112 (as shown by data 314) before, during or after being re-encrypted.

Processors 316 may be communicably coupled to storage devices 312 and be capable of executing instructions encoding arithmetic, logical, or I/O operations. Processors 316 may include one or more general processors, Central Processing Units (CPUs), secure cryptoprocessors (e.g., Hardware Security Module (HSM), Trusted Platform Module (TPM)), Application Specific Integrated Circuits (ASICs), Field Programmable Gate Arrays (FPGAs), Graphical Processing Units (GPUs), Data Processing Units (DPUs), other processing unit, or a combination thereof. Processors 316 may be a single core processor, which may be capable of executing one instruction at a time (e.g., single pipeline of instructions) or a multi-core processor, which may simultaneously execute multiple instructions. Processors 316 may interact with storage devices 312 and provide one or more features defined by Confidential Computing Consortium (CCC), Trusted Computing Group (TCG), other organization, or a combination thereof.

Processors 316 (e.g., CPU) may establish a trusted execution environment across multiple hardware devices of hardware platform 310 (e.g., processor and storage devices) and may include instructions (e.g., opcodes) to initiate, configure, and maintain the trusted execution environment 112. In one example, a trusted execution environment may be implemented using Software Guard eXtensions™ (SGX) provided by Intel®, Secure Encrypted Virtualization™ (SEV) provided by AMD®, TrustZone™ provided by ARM®, Secure Execution provided by IBM®, MultiZone™ provided RISC-V™, Secure Execution Environment provide by Qualcomm (QSEE), other technology, or a combination thereof.

Trusted execution environment 112 may be a security enhanced area in computing device 110 that may guard the data of a computing process that is providing a service from being accessed by other computing processes on computing device 110. A trusted execution environment (TEE) may enhance security by enhancing confidentiality (e.g., reducing unauthorized access), integrity (e.g., reduce unauthorized modifications), availability (e.g., enable authorized access), non-repudiation (e.g., action association), other aspect of digital security or data security, or a combination thereof. Trusted execution environment 112 may be the same or similar to a trust zone (e.g., ARM TrustZone®), trust domain (e.g., Intel Trust Domain™), other term, or a combination hereof and may include one or more enclaves, realms, curtained memory. Trusted execution environment 112 may protect data 314 while data 314 is in use (e.g., processed by processor 316), is in motion (e.g., transmitted over network 140), is at rest (e.g., stored in a persistent data storage device), or a combinational thereof. Trusted execution environment 112 may be a set of one or more trusted execution environments and each of the trusted execution environments may be referred to as an instance of a trusted execution environment (i.e., TEEi). Each trusted execution environment 112 may isolate data of at least one process executed in trusted execution environment 112 from processes executing external to the trusted execution environment. The at least one process may be a set of one or more processes associated with an execution construct being guarded by the trusted execution environment 112.

The execution construct may be a virtual machine, container, computing process, thread, instruction stream, or a combination thereof. In one example, trusted execution environment 112 may execute a particular virtual machine (e.g. VM based TEE) and may guard data of the virtual machine from a hypervisor managing the virtual machine. In this example, computing device 110 may execute executable code in trusted execution environment 112 as a virtual machine process and the executable code and data in the trusted execution environment may be accessible to the virtual machine process and inaccessible to a hypervisor managing the virtual machine process. As such, the trusted execution environment 112 of computing device may host a virtual machine that executes the executable data and all the data in the trusted execution environment may be accessible to the virtual machine and inaccessible to a hypervisor managing the virtual machine.

In another example, trusted execution environment 112 may be associated with a particular computing process (e.g., process based TEE or container based TEE) and may guard data of the particular computing process from being accessed by other equally privileged, higher privileged, or lower privileged computing processes (e.g., guard application process against higher privileged Operating System (OS) process). In this example, computing device 110 may execute the executable code in trusted execution environment 112 as one or more application processes and the executable code in the trusted execution environment 112 may be accessible to the one or more application processes and inaccessible to a supervisor (e.g., kernel or container runtime) managing the one or more application processes. As such, trusted execution environment 112 of computing device 110 may host one or more application processes that execute the executable data and the data in the trusted execution environment may be accessible to the one or more application processes and be inaccessible to a kernel managing the one or more application processes. In either example, the data in the trusted execution environment 112 may be guarded by storing the data 314 in a trusted storage area 313.

Trusted storage area 313 may be an area of one or more storage devices 312 that stores data of a computing process in an encrypted form (e.g., ciphertext). As shown in FIG. 1, trusted storage area 313 may be a part of trusted execution environment 112 and may store data 314 of service 114A in an encrypted form. Data 314 may be encrypted and decrypted by hardware devices using cryptographic input that includes one or more cryptographic keys. In one example, the cryptographic keys may be accessible to the hardware devices (e.g., processor 316) and may be inaccessible to operating system level processes and threads executed by the hardware device. In another example, the cryptographic keys may be accessible to hardware devices and one or more computing processes, such as, the computing process associated with the trusted execution environment. In either example, the encryption and decryption performed by the hardware device may be referred to as hardware based encryption, hardware level encryption, hardware assisted encryption, hardware enforced encryption, hardware isolation, process transparent encryption, container transparent encryption, virtual machine transparent encryption, or other term and may use cryptographic key data (e.g., encryption and decryption keys) that are accessible to the processor and are inaccessible to all processes executed external to the trusted execution environment 112.

Trusted storage area 313 may include a portion of memory and may be referred to as an encrypted memory area. An encrypted memory area may be a contiguous or non-contiguous portion of virtual memory, logical memory, physical memory, other storage abstraction, or a combination thereof. The encrypted memory area may correspond to or be mapped to a portion of processor cache (CPU L1, L2, L3 cache), primary memory (e.g., main memory), auxiliary memory (e.g., solid state storage), adapter memory (e.g., memory of graphics card, or network interface cart), other persistent or non-persistent storage, or a combination thereof. In one example, the encrypted memory area may be a portion of main memory associated with a particular process and a processor may encrypt the data when storing the data in the memory area and may decrypt the data when retrieving the data from the memory area. In another example, the encrypted memory area may be portions of main memory and CPU cache that are associated with a particular process. One or more processors (e.g., CPU and cryptoprocessor) may encrypt the data of a memory unit (e.g., page, block, frame, cache line) when storing the data in the memory area and may decrypt the data when retrieving the data from the memory area. In either example, the data in the memory area may be transformed (e.g., encrypted or decrypted) before, during, or after it is stored in or retrieved from the memory area and may remain in an encrypted form while in the encrypted memory area.

Trusted storage area 313 may store the data in one or more storage units. The storage units may be logical or physical units of data storage for managing the data (e.g., storing, organizing, or accessing the data). A storage unit may include a contiguous or non-contiguous sequence of bytes or bits. In one example, a storage unit may be a virtual representation of underlying physical storage units, which may be referred to as physical storage blocks. Storage units may have a unit size that is the same or different from a physical block size provided by an underlying hardware resource. The storage unit may include volatile or non-volatile data storage. In one example, storage units may be a memory segment and each memory segment may correspond to an individual memory page, multiple memory pages, or a portion of a memory page. In other examples, each of the storage units may correspond to a portion (e.g., block, sector) of a mass storage device (e.g., hard disk storage, solid state storage). The data in the storage units of trusted storage area 313 may be transmitted to other hardware devices using trusted IO 315.

Trusted IO 315 may enable the data of a computing process to be transmitted between hardware devices in a security enhanced manner. The data may be transmitted over one or more system buses, networks, or other communication channel in an encrypted or partially encrypted form. This may be advantageous because transmitting the data in an encrypted form may limit the ability of the data to be snooped or sniffed while being transmitted between or within hardware devices. As shown in FIG. 3, trusted IO 315 may enable the data of service 114A to be transmitted within and between trusted storage area 313 and trusted processor area 317.

Trusted processor area 317 may be a portion of processor 316 that is associated with service 114A and guards data of service 114 from being accessed or modified by services 114B-C. Trusted processor area 317 may include a portion of processor 316 that stores the data (e.g., CPU cache, processor memory or registers) and a portion of processor 316 that executes the data (e.g., processor core). Trusted processor area 317 may store the data in an encrypted form or in a decrypted form when it is present on the processor and in either example, the data of the computing process may be protected from being accessed or modified by other processes via the design of the processor and encryption may not be required to ensure isolation of the data when the data is within the processor packaging (e.g., chip packaging) or within particular levels of cache. For example, data may be encrypted in higher levels of cache (e.g., L4, L3, L2) and remain unencrypted in lower levels of cache (e.g., L1 instruction and L1 data).

Computing device 110 may use the same processor and storage device to establish multiple trusted execution environments 112 (not shown). Each trusted execution environment may be referred to as an instance of a trusted execution environment (e.g., TEE instance, TEEi) may be established for a particular set of one or more computing processes (e.g., programs for one or more services) and may be associated with a particular memory encrypted area. The instances of a trusted execution environment may be provided by the same hardware (e.g., processor and memory) but each instance may be associated with a different memory encrypted area and a different set of one or more services. Each instance may guard all data of a service or a portion of the data of a computing process. For example, service 114A (e.g., process, container, or VM) may be associated with both a trusted execution environment and an untrusted execution environment. In this situation, a first portion of the data of service 114B may be stored and/or executed within a trusted execution environment (not shown) and a second portion of the data of service 114B may be stored and/or executed within an untrusted execution environment. The second portion may be stored in the same storage device as the first portion but the second portion may be stored in a decrypted form and may be executed by processor 316 in a manner that enables another process (e.g., multiple higher privileged processes) to access or modify the data. In either example, trusted execution environment may be used to execute one or more of the services 114A-C.

Services 114A-C may be on the same computing device 110 (e.g., host machine) and may each correspond to one or more computing processes, containers, virtual machines, or a combination thereof. Each of the services 114A-C may include one or more streams of execution for executing programmed instructions in a trusted execution environment. The services may be unaware they are executing in a trusted execution environment because the TEE features can be provided by hardware processors at a lower level. However, the hardware processors may provide an API with instructions that enable the service (e.g., program) to determine it is running in a trusted execution environment (e.g., see local attestation below). The stream of instructions executed by the trusted execution environment may include a sequence of instructions that can be executed by one or more processor cores.

Each of the computing processes may be managed by an operating system 225 or may part of an operating system (e.g., kernel, not shown). In one example, a computing process may be an instance of a computer program that is being executed and may contain program code (e.g., executable code, executable data) and a state of the current activity. Multiple computing processes may be executed concurrently by a processing device that supports multiple processing units. The processing units may be provided by multiple processors or from a single processor with multiple cores or a combination thereof. A computing process may include one or more computing threads, such as a system thread, user thread, or fiber, or a combination thereof. A computing process may include a thread control block, one or more counters and a state (e.g., running, ready, waiting, start, done).

Services 114A-C may each be a program that is executing with user space privileges or kernel space privileges and may be referred to as application processes, user space processes, kernel processes, background processes. A user space process (e.g., user mode process, user privilege process) may have lower level privileges that provide the user space process access to a user space portion of data storage without having access to a kernel space portion of data storage. In contrast, a kernel process may have higher privileges that provide the kernel process access to a kernel space portion and to user space portions that are not guarded by a trusted execution environment. In one example, the privilege associated with a user space process may change during execution and a computing process executing in user space (e.g., user mode, user land) may be granted enhanced privileges by an operating system and function in kernel space (e.g., kernel mode, kernel land). This may enable a user space process to perform an operation with enhanced privileges. In another example, the privilege associated with a user space process may remain constant during execution and the user space process may request an operation be performed by another computing process that has enhanced privileges (e.g., operating in kernel space).

The privilege levels of a computing process may be the same or similar to protection levels of processor 316 (e.g., processor protection rings) and may indicate an access level of a computing process to hardware resources (e.g., virtual or physical resources). There may be multiple different privilege levels assigned to the computing process. In one example, the privilege levels may correspond generally to either a user space privilege level or a kernel privilege level. The user space privilege level may enable a computing process to access resources assigned to the computing process but may restrict access to resources assigned to another user space or kernel space computing process. The kernel space privilege level may enable a computing process to access resources assigned to other kernel space or user space computing processes. In another example, there may be a plurality of privilege levels, and the privilege levels may include a first level (e.g., ring 0) associated with a kernel, a second and third level (e.g., ring 1-2) associated with device drivers, and a fourth level (e.g., ring 3) that may be associated with user applications.

Operating system 225 may include one or more programs that are run to manage one or more of the services 114A-C. Operating system 225 may include a kernel that execute as one or more kernel processes and may manage access to physical or virtual resources provided by hardware devices. A kernel process may be an example of a computing process associated with a higher privilege level (e.g., hypervisor privilege, kernel privilege, kernel mode, kernel space, protection ring 0). In one example, operating system 225 may be a host operating system, guest operating system, or a portion thereof and the services 114A-C may be different applications that are executing as user space processes. In another example, operating system 225 may be a hypervisor that provides hardware virtualization features and the services 114A-C may be different virtual machines. In yet another examples, operating system may include a container runtime (e.g., Docker, Container Linux) that provides operating system level virtualization and the services 114A-C may be different containers. In further examples, operating system 225 may provide a combination thereof (e.g., hardware virtualization and operating system level virtualization).

The kernel of operating system 225 may segregate storage devices 312 (e.g., main memory, hard disk) into multiple portions that are associated with different access privileges. At least one of the multiple portions may be associated with enhanced privileges and may be accessed by processes with enhanced privileges (e.g., kernel mode, kernel privilege) and another portion may be associated with diminished privileges and may be accessed by processes with both diminished privileges (e.g., user space mode, user space privilege) and those with enhanced privileges. In one example, the portion of storage devices 312 associated with the enhanced privileges may be designated as kernel space and the portion of storage devices 312 associated with the diminished privileges may be designated as user space. In other examples, there may be more or less than two portions.

When the kernel provides features of a hypervisor it may also be known as a virtual machine monitor (VMM) and may provide virtual machines with access to one or more features of the underlying hardware devices. A hypervisor may run directly on the hardware of computing device 110 (e.g., host machine) or may run on or within a host operating system (not shown). The hypervisor may manage system resources, including access to hardware devices. The hypervisor may be implemented as executable code and may emulate and export a bare machine interface to higher-level executable code in the form of virtual processors and guest memory. Higher-level executable code may comprise a standard or real-time operating system (OS), may be a highly stripped down operating environment with limited operating system functionality and may not include traditional OS facilities, etc.

Figure 4:
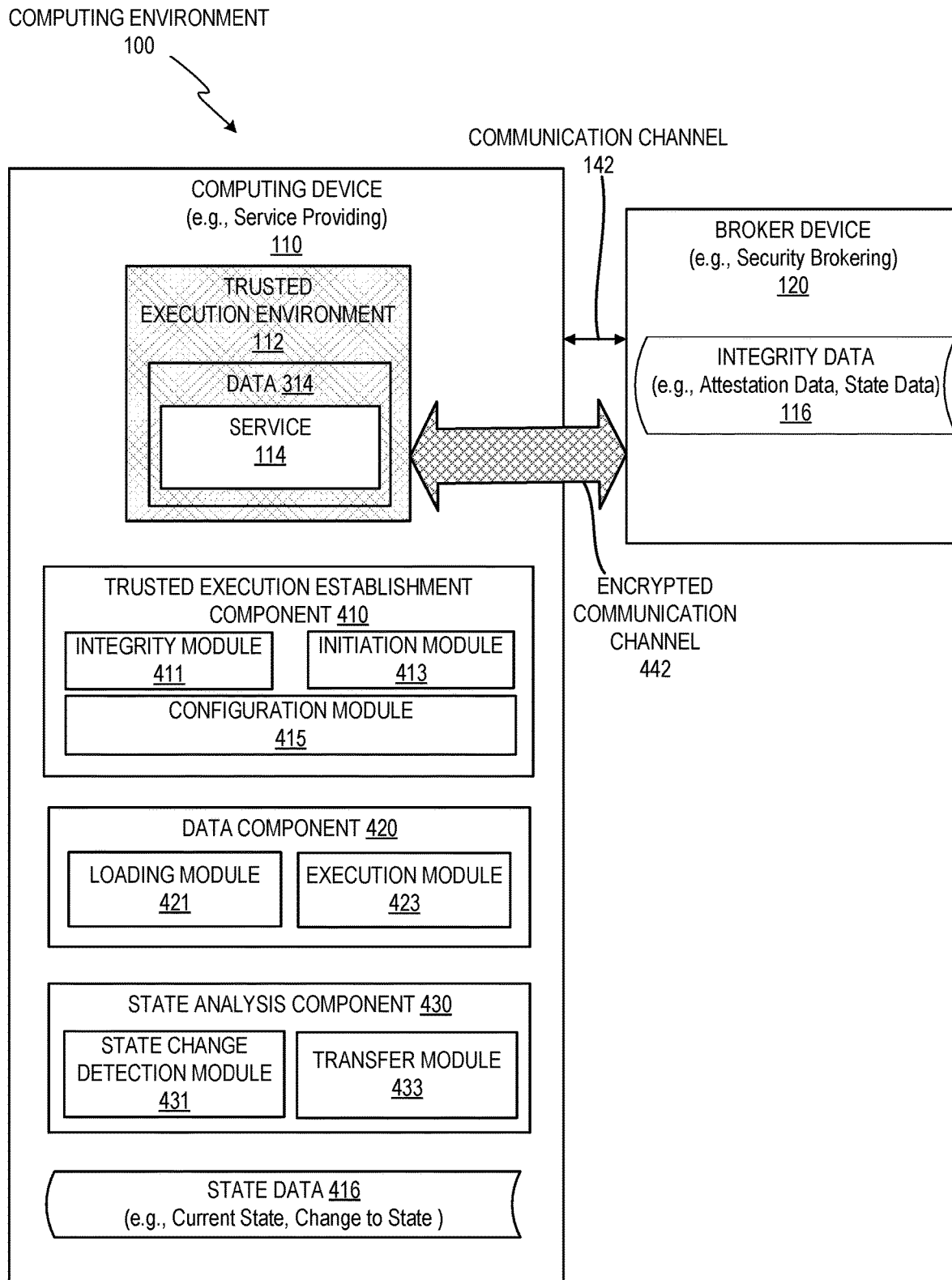
FIG. 4 depicts a block diagram of an example computing device that can establish a trusted execution environment and can generate and transfer integrity data (e.g., attestation data and state data) to the broker device, in accordance with one or more aspects of the present disclosure.

FIG. 4 depicts a block diagram illustrating portions of computing environment 100 and emphasizes the interactions between broker device 120 and a computing device 110 that is executing service 114 in trusted execution environment 112. Trusted execution environment 112 and service 114 may be the same or similar to the respective one or more trusted execution environments 112A-C and services 114A-C of FIGS. 1-3. In the example shown in FIG. 4, computing device 110 may include a trusted execution establishment component 410, a data component 420, and a state analysis component 430.

The components and modules discussed herein may be performed by any portion of a computing device 110. For example, one or more of the components or modules discussed below may be performed by processor circuitry, processor firmware, device driver, kernel, hypervisor, container runtime, operating system, application, other program, or a combination thereof. More or less components or modules may be included without loss of generality. For example, two or more of the components may be combined into a single component, or features of a component may be divided into two or more components. In one implementation, one or more of the components may reside on different computing devices.

Trusted execution establishment component 410 may enable computing device 110 to establish one or more trusted execution environments 112 in computing device 110. Establishing a trusted execution environment 112 may involve creating a new trusted execution environment or updating an existing trusted execution environment. Each of the one or more trusted execution environments 112 may be associated with a service 114 that includes a set of one or more computing processes and may store and execute data 314 of service 114. In one example, trusted execution establishment component 410 may include an integrity module 411, an initiation module 413, and a configuration module 415.

Integrity module 411 may enable computing device 110 to perform an integrity check to verify the integrity of computing device 110 (e.g., integrity of hardware platform 310, operating system 225, data 314, service 114, and/or one or more computer processors 316). Integrity module 411 may enable a program to check the capabilities of computing device 110 and to detect unauthorized changes to programs, hardware devices, data, other portions of computing device 110, or a combination thereof. The unauthorized changes may be the result of malicious, defective, or accidental actions by a program or hardware device.

Integrity module 411 may perform a process that is the same or similar to attestation, which includes performing local attestation, remote attestation, or a combination thereof. Local attestation may involve enabling a program executed locally on computing device 110 to verify the integrity of computing device 110. Remote attestation may involve enabling a program executed remotely on a different computing device (e.g., broker device 120) to verify the integrity of computing device 110. The remote attestation may be performed non-anonymously by disclosing data that uniquely identifies computing device 110 or anonymously without uniquely identifying computing device 110 (e.g., Direct Anonymous Attestation (DAA)). In either example, integrity module 411 may perform one or more integrity operations (e.g., attestation operations) to determine integrity data 116 and may transmit integrity data 116 to the programs executing on the local or remote computing devices for verification.

Integrity module 411 may perform operations before, during, or after trusted execution environment 112 is established on computing device 110 and may provide integrity data that is specific to the initiation, configuration, or execution of the trusted execution environment 112. In one example, an integrity check may involve performing a key exchange between the hardware platform of computing device 110 and a remote computing device (e.g., Diffie-Hellman Key Exchange), establish hardware root of trust, and/or provide measurement and configuration values of trusted execution environment 112 to the remote computing devices.

Initiation module 413 may enable computing device 110 to initiate the configuration of a trusted execution environment before, during, or after the execution of integrity module 411. Initiation module 413 may execute one or more instructions recognized by the processor (e.g., Intel SGX opcodes, AMD SEV opcodes, ARM TrustZone opcodes). The instructions may be called by a program associated with an application, kernel, operating system, hypervisor, boot-loader, Basic Input Output Services (BIOS), hardware adapter, other entity, or a combination thereof. In one example, a program that will execute in trusted execution environment 112 may initiate the creation of the trusted execution environment. In another example, a program may initiate the creation of trusted execution environment 112 and trusted execution environment 112 may be used for executing another program. In either example, after trusted execution environment 112 is initiated it may be configured by configuration module 415.

Configuration module 415 may enable computing device 110 to configure a trusted execution environment to store or execute data of service 114 (e.g., process, container, or virtual machine). Configuration module 415 may configure the trusted execution environment in view of configuration data provided by a process initiating or using the trusted execution environment, by a processor, storage device, other portion of computing device 110, or a combination thereof. The configuration data may be provided as input before, during, or after the trusted execution environment is initiated, created, or updated. As discussed above, a trusted execution environment may include a trusted storage area, a trusted processor area, trusted IO, or a combination thereof and the configuration data may include data for configuring one or more of these. For example, configuration data may include an execution construct data (e.g., processes identifier (PID), virtual machine identifier (VMID)), a storage data (e.g., storage size or location), cryptographic data (e.g., encryption key, decryption key, seed, salt, nonce), other data, or a combination thereof. One or more of these may be configured or customize and associated with the trusted execution environment for service 114. In one example, the trusted execution environment may include an encrypted storage area and the configuration data may indicate a size of the encrypted storage area that will be allocated to store data of service 114 (e.g., size of virtual memory for a trusted storage area).

Configuration module 415 may configure different aspects of the trusted execution environment to use different cryptographic techniques. The different cryptographic techniques may use different cryptographic functions, cryptographic settings, cryptographic keys, cryptographic inputs, other cryptographic data, or a combination thereof. In one example, data of a computing process that will be executed by the trusted execution environment 112 may be encrypted using a first cryptographic technique (e.g., encrypted using a location independent transport key) when loaded by the processor and may be encrypted using a second cryptographic technique (e.g., encrypted using a location dependent storage key) when stored in the encrypted storage area. This may be advantageous because the data may be more vulnerable to attack when it is stored on a removable storage device (e.g., memory module) then when it is transferred over the system bus and therefore different cryptographic techniques may be used.

Data component 420 may enable computing device 110 to load data 314 of a service 114 into trusted execution environment 112 to enhance the confidentiality and integrity of service 114. Data 314 may include executable data (e.g., program code, service code), non-executable data (e.g., service information, consumer data), other data, or a combination thereof. In one example, data component 420 may include a loading module 421, and an execution module 423.

Loading module 421 may include instructions for loading data into trusted execution environment 112. Loading data 314 may involve copying data, moving data, updating data, modifying data, or other action affecting data 314. The process of loading data 314 may involve copying data into the trusted processor area from the trusted storage area, copying data into the trusted storage area from an untrusted area, other copy operation, or a combination thereof. Trusted execution environment 112 may store the data of service 114 in the encrypted storage area and the loading may involve the processor receiving the data in an encrypted form over a bus from the encrypted storage area (e.g., retrieving data via trusted TO). Trusted execution environment 112 may include or be associated with a particular portion of memory (e.g., specific range of addresses) and a particular portion of the processor (e.g, particular core) and the data that is loaded into the trusted execution environment 112 may be accessible to the computing process and inaccessible to the kernel prior to the enabling.

Execution module 423 may enable computing device 110 to cause service 114 to be executed by trusted execution environment 112. As discussed in regards to FIG. 3, computing device 110 may include an operating system 225 that manages the execution of multiple computing processes and services. Execution module 423 may be a part of the operating system or interact with the operating system to initiate the execution of service 114 as a computing process, container, virtual machine, or a combination thereof. Although the operating system may not have access to a decrypted version of the data in trusted execution environment 112, it may be able to manage when the computing process executes and the operations it performs.

State analysis component 430 may enable a computing device to analyze a state of trusted execution environment executing a service and to update integrity data based on the state of the service or a change to the state of the service. State analysis component 430 may monitor changes to the state that occur before, during, or after the service is loaded and begins executing. In one example, state analysis component 430 may include a state change detection module 431 and a transfer module 433.

State change detection module 431 may enable computing device 110 to detect a state or a change to the state of trusted execution environment 112 executing service 114. For example, the state may be or include a state of trusted execution environment 112, service 114, data 314, an operating system, a virtual machine, a container, other portion of computing device 110, or a combination thereof. In one example, trusted execution environment 112 executes a virtual machine that includes service 114 and the state is the state of a virtual machine image of the virtual machine. In another example, trusted execution environment 112 executes a container that includes service 114 and the state is the state of a container image of the container. In yet another example, trusted execution environment 112 executes a computing process that provides service 114 and the state is the state of the process (e.g., process memory, process image). In either example, the respective images may be based on the executable data and non-executable data in trusted execution environment 112. The state may be based on data structures for memory (e.g., call stack, heap), operating system descriptors (e.g., file descriptors/handles, sockets), security attributes (e.g., process token, inodes), processor state (e.g., context, process control blocks, computer register content), other data or data structures, or a combination thereof. The states and the changes to the states may represented by state data 314.

State data 314 may represent the state discussed above and is an example of integrity data that may be the same or similar to integrity data 116 of FIG. 1-2. State data 314 may include hash data (e.g., hash, digital signature), identification data (e.g., processor model or security version), cryptographic data (e.g., certificates, authentication keys, signature keys, endorsement keys, session keys, encryption or decryption keys), measurement data, report data, configuration data, settings data, other data, or a combination thereof. In one example, state data 314 (e.g., integrity data) represents the state of trusted execution environment 112 at a point in time that is after the service begins its execution (e.g., initialized) and before the service ends its execution (e.g., terminated) and includes a hash that is based on both a certificate of the hardware platform and state data representing an earlier state of the trusted execution environment 112.

State data 314 may be generated or obtained by any portion of computing device 110. For example state data 314 may be generated or obtained by service 114, an agent executing within the trusted execution environment 112, operating system 225 (e.g., kernel, device driver), hardware platform 310 (e.g., processor, memory controller, firmware, BIOS), or a combination thereof. The agent may be a program that is executing as a computing process or thread within trusted execution environment 112. The agent may access and record (e.g., track, observe, copy, detect, determine) process or processor data and data structures of service 114.

State change detection module 431 may generate hashes of data at different points in time and compare the hashes to detect if a change is present. The different points in time may be based on particular times (e.g., every x seconds) or on particular events, such as, when data is loaded, executed, accessed, check pointed, paused, paged/swapped out, paged/swapped in, other time, or a combination thereof. In one example, state change detection module 431 may be based on an Integrity Measurement Architecture (IMA) that is built into computing device 110 (e.g., embedded into operating system 225). The IMA may calculate hashes when data is loaded into main memory or into processor cache. The calculated hashes may be checked (e.g., appraised) by comparing them to subsequent hashes to detect whether there is a change.

Transfer module 433 may enable computing device 110 to transfer state data 314 and integrity data 116 between computing device 110 and broker device 120 without exposing the data to processes running external to trusted execution environment 112. Transfer module 433 may transfer the data to broker device 120 that is accessible over an external connection (e.g., network, internet, ethernet, or cellular connection) using a network adapter. The network adapter may write the data directly to memory of computing device 110 (e.g., Direct Memory Access (DMA)) or may provide the data to the processor and the processor may write the data to memory. In one example, computing device 110 may transfer data (e.g., state data 314, integrity data 116) over one or more encrypted communication channels 442.

Encrypted communication channel 442 may be security enhanced communication channels that connect trusted execution environment 112 of computing device 110 with one or more remote computing devices (e.g., broker device 120). Encrypted communication channel 442 may be established by the hardware platform (e.g., processor) and may encrypt the data that is transferred over the encrypted communication channel using hardware based encryption so that the data is accessible to the hardware platform and trusted execution environment 112 without being accessible to any process executed external to the trusted execution environment 112. As such, when transfer module 433 sends or receives data it may be accessible to the hardware platform of computing device 110 in a decrypted form without being accessible to the operating system of computing device 110 in an unencrypted form (i.e., access to ciphertext or no access at all)

Figure 5:
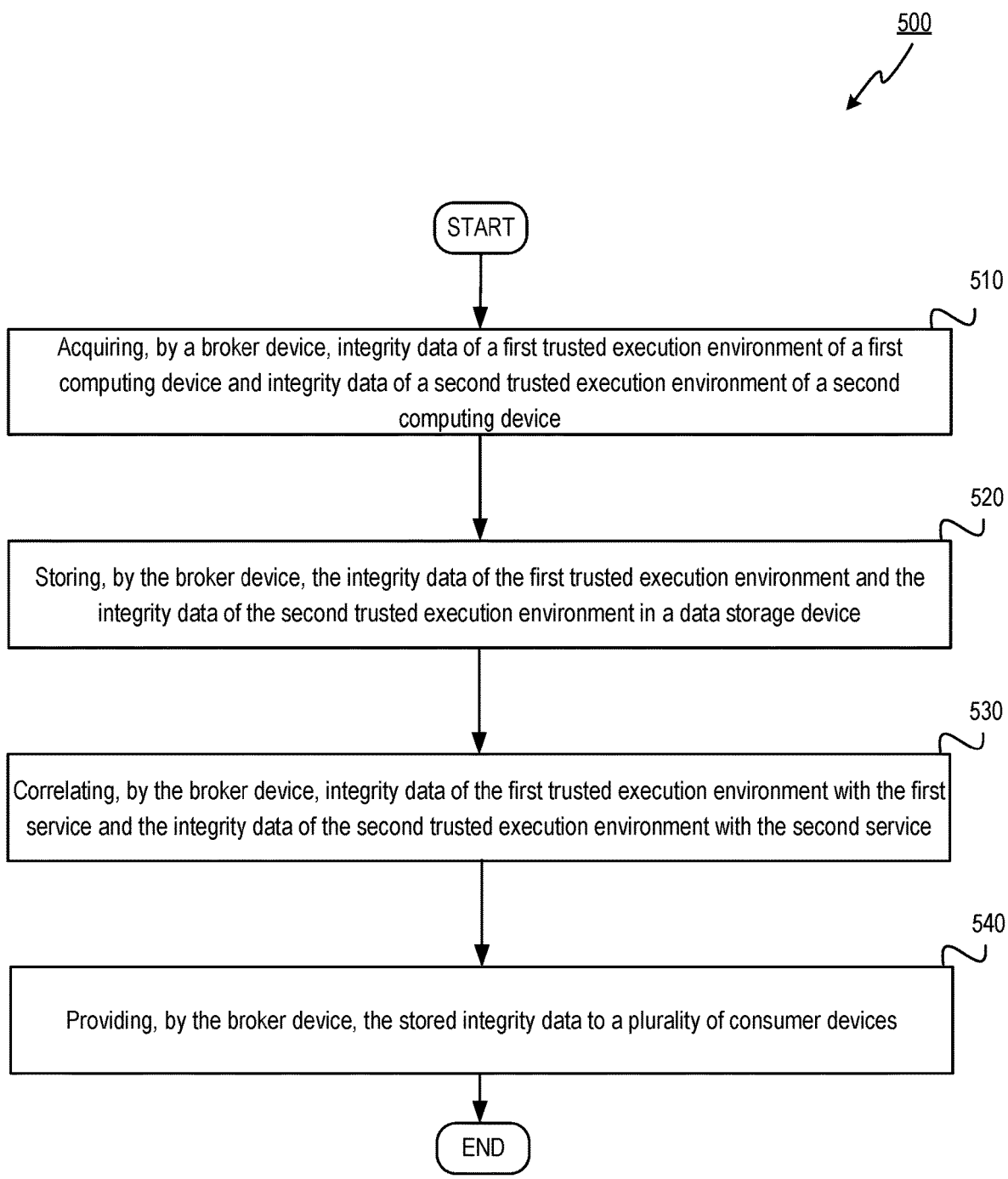
FIG. 5 depicts a flow diagram of an example method performed by a broker device to acquire integrity data for multiple services and to provide the integrity data to one or more consumer devices, in accordance with one or more aspects of the present disclosure.
Figure 6:
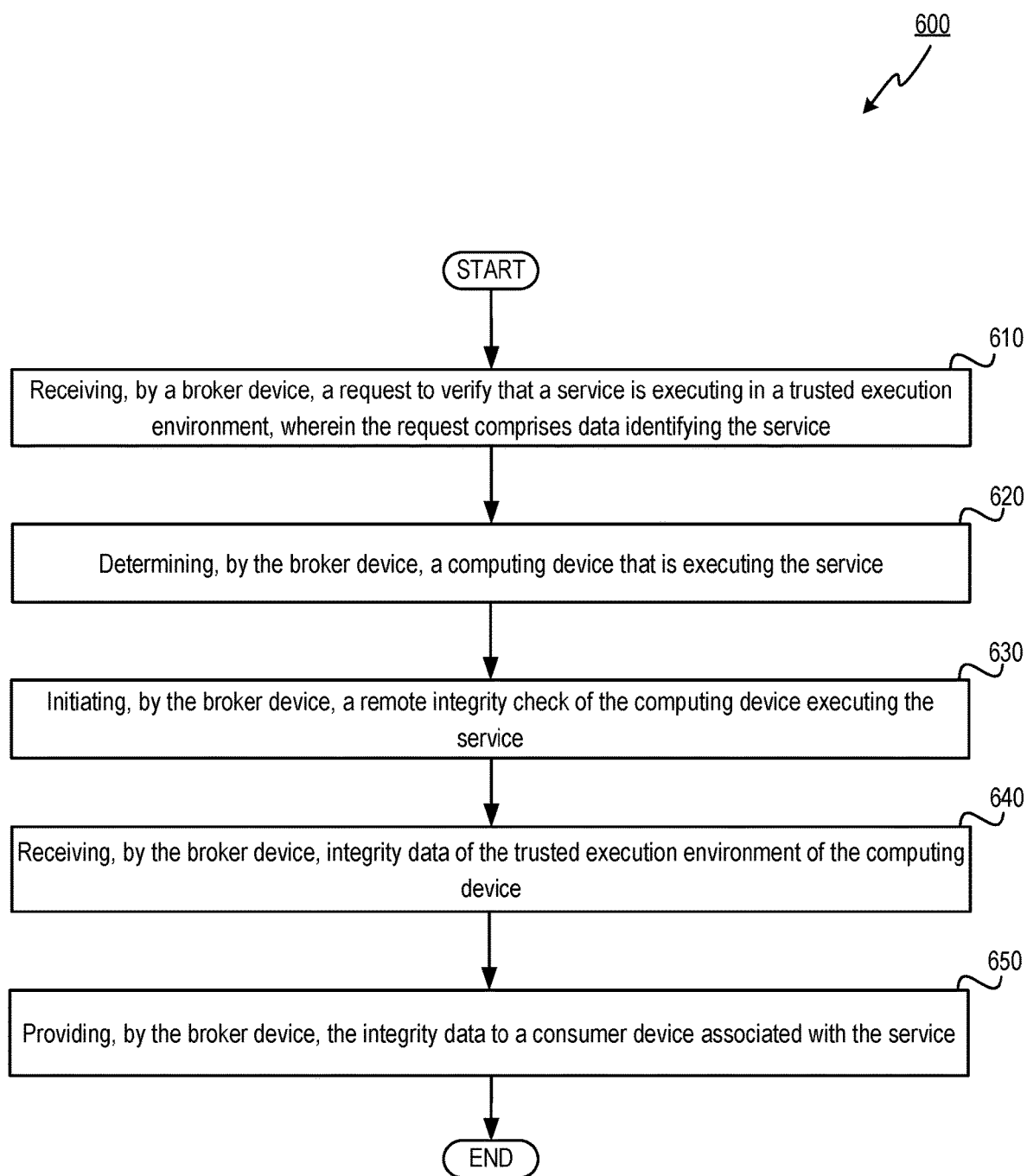
FIG. 6 depicts a flow diagram of an example method performed by one or more broker devices to acquire integrity data and provide the integrity data to a consumer device, in accordance with one or more aspects of the present disclosure.
Figure 7:
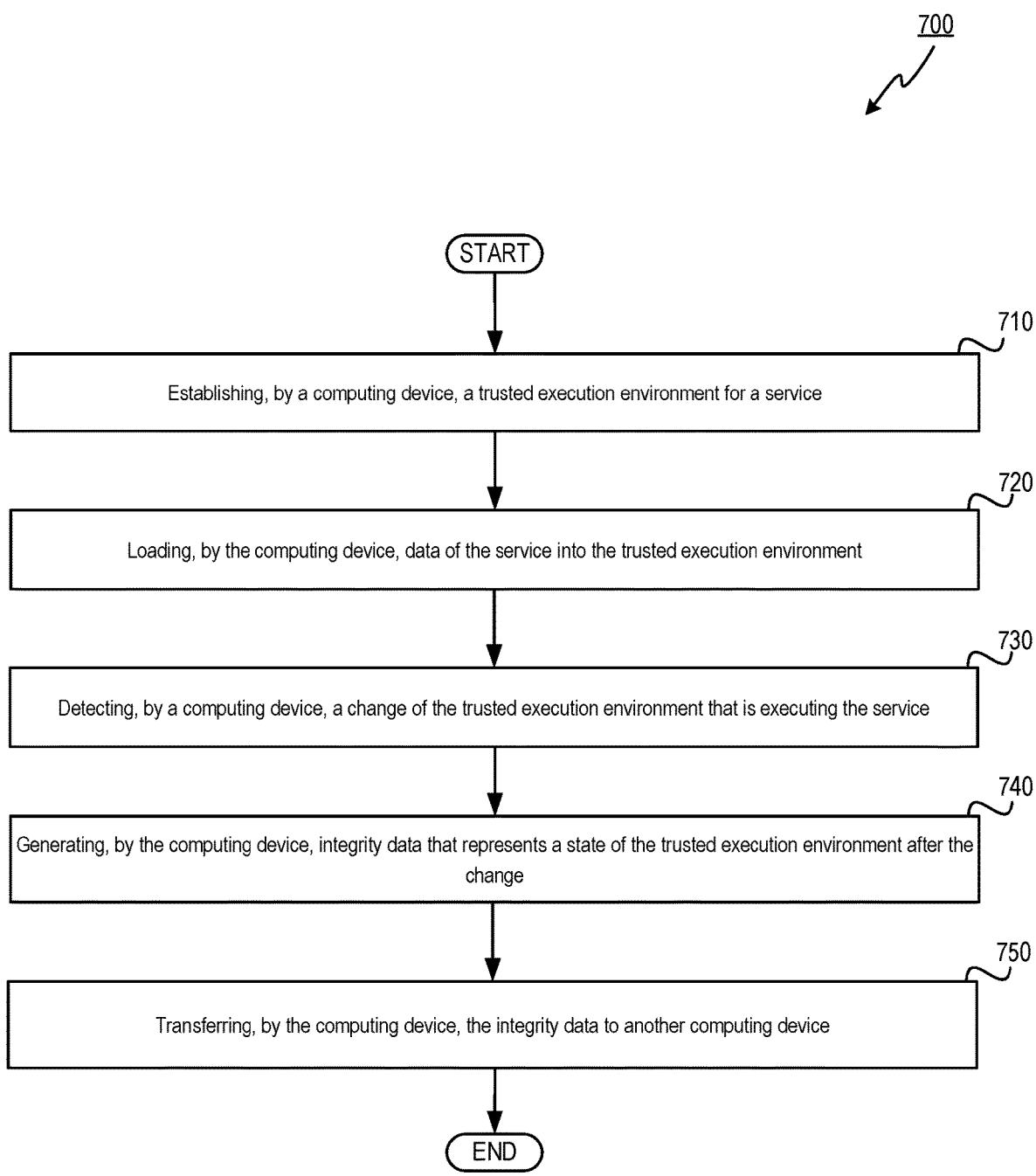
FIG. 7 depicts a flow diagram of an example method performed by a consumer device to generate and transfer integrity data (e.g., state data) to a broker device, in accordance with one or more aspects of the present disclosure.

FIGS. 5-7 depict flow diagrams for illustrative examples of methods 500, 600, and 700 that involve using a broker device to acquire and store integrity data that can be used to verify that particular services are executing in trusted execution environments, in accordance with one or more aspects of the present disclosure. Methods 500 and 600 may be performed by broker device 120 and enable broker device 120 to acquire integrity data of a service and provide the integrity data to one or more consumer devices of the service. Method 700 may be performed by computing device 110 and enables computing device 110 to execute the service in a trusted execution environment and to generate integrity data representing one or more states of the service over time. Methods 500, 600, and 700 may be performed by devices that comprise hardware (e.g., circuitry, dedicated logic, programmable logic, microcode, etc.), executable code (such as is run on a general purpose computer system or a dedicated machine), or a combination of both. Methods

500, 600, and 700 and each of their individual functions, routines, subroutines, or operations may be performed by one or more processors of the computing device executing the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

Referring to FIG. 5, method 500 may be performed by broker device 120 or any computing device that is acquiring integrity data and using the integrity data to enable consumer devices to verify that services are executing in a trusted execution environment. Method 500 may begin at block 510, where a processing device may acquire integrity data of a trusted execution environment of a first computing device and integrity data of a trusted execution environment of a second computing device. The first trusted execution environment may execute a first service and the second trusted execution environment may execute a second service. The first and second computing devices may include a Trusted Computing Base (TCB) that establishes the trusted execution environment (TEE) executing the respective services. The TEEs provide Confidential Computing (CC) for the services by encrypting the data of the services that are stored in main memory and in use by the computing devices. In one example, acquiring the integrity data of the trusted execution environments is performed in response to receiving, from a consumer device, a request to verify the services are executing in a trusted execution environment. In another example, acquiring the integrity data of the trusted execution environments is performed prior to receiving a request (e.g., any message) from any consumer devices. In either example, acquiring the integrity data may involve the broker device initiating a remote attestation of the first computing device and a remote attestation of the second computing device. The remote attestation may involve one or more local attestations, remote attestation, direct anonymous attestation (DAA), or a combination thereof.

At block 520, the processing device may store the integrity data of the first trusted execution environment and the integrity data of the second trusted execution environment. The integrity data may be stored in a persistent data storage device, a non-persistent data storage device, or a combination thereof. The integrity data of the first trusted execution environment on the first computing device may include attestation data of a central processing unit (CPU) that includes Software Guard Extensions (SGX) (e.g., Intel x86 microprocessor). The integrity data of the second trusted execution environment on the second computing device may include attestation data of a central processing unit (CPU) comprising Secure Encrypted Virtualization (SEV) (e.g., AMD x86 microprocessor). In one example, the integrity data of the computing devices may be verified using a hash function. The verifying may be performed by the processing device of the broker device or the processing devices of the consumer devices.

At block 530, the processing device may correlate the integrity data of the first trusted execution environment with the first service and the integrity data of the second trusted execution environment with the second service. The first service and the second service may be part of a service mesh and the first service may communicate with the second service to satisfy one or more requests of the plurality of consumer devices. In one example, the first and second service may register with a security brokering service that is executed by the processing device and performs one or more blocks of method 500.

At block 540, the processing device may provide the stored integrity data to a plurality of consumer devices. The integrity data of the first computing device may be provided to a consumer device associated with the first service and the integrity data of the second computing device may be provided to a consumer device associated with the second service. In one example, the processing device may provide the integrity data of each computing device together with integrity data of the broker device to at least one of the consumer devices. In another example, the processing device may provide each of the consumer devices the integrity data of the first computing device together with the integrity data of the second computing device. Responsive to completing the operations described herein above, method 500 may terminate.

Referring to FIG. 6, method 600 may be performed by a computing device that is configured to function as a broker device and acquires integrity data that can be used to verify to consumers that one or more services are executing in trusted execution environments. Method 600 may begin at block 610, where a processing device may receive a request to verify that a service is executing in a trusted execution environment. The request may include data identifying the service or computing device providing the service. In one example, the request to verify is received directly from the consumer device (e.g, consumer verification request) and providing the integrity data involves the broker device transmitting the integrity data directly to the consumer device (e.g., consumer verification response). In another example, the request to verify is received from another broker device that received the request from the consumer device and the processing device provides the integrity data to the consumer device by transmitting the integrity data to either the other broker device that then provides it to the consumer device or to the consumer device directly. In one example, there may be a set of broker devices that are organized in a hierarchical topology. The hierarchical topology may be or include a tree topology, a star topology, a bus topology, a ring topology, other topology, or a combination thereof. Each broker device in the set may correspond to a specific service mesh (e.g., fulfilling requests for a specific set of services), a specific geographic location (e.g., fulfilling requests from consumer devices from the specific location), or a specific type of Trusted Execution Environment (TEE) (e.g., fulfilling requests for services executing in specific TEE type), or a combination thereof. The type of TEE may be based on a TEE using Secure Encrypted Virtualization (SEV), a TEE using Software Guard Extensions (SGX), a TEE using a TrustZone, a TEE using another technology, or a combination thereof.

At block 620, the processing device may determine the computing device that is executing the service. In one example, the processing device may look up the service to determine which computing device is hosting the service. In another example, the processing device may initiate the service to be started by transmitting a request comprising identification data of the service to another device (e.g., management server, provisioning server, orchestration server, deployment server). The processing device may subsequently receive data identifying the computing device after the service begins executing. In yet another example, the processing device may identify executable data of the service and may identify and provision the computing device to execute the executable data. The executable data (e.g., executable code) may be an executable file, an executable virtual machine image, or an executable container image, other program code, or a combination thereof.

At block 630, the processing device may initiate a remote integrity check of the computing device executing the service. The processing device may initiate the remote integrity check by transmitting a request for integrity data to the computing device (e.g., verification request). In one example, the remote integrity check may be the same or similar to local attestation, remote attestation, direct anonymous attestation (DAA), or a combination thereof. The remote integrity check may cause the hardware platform of the computing device to generate or updated integrity data, which may be referred to as attestation data, state data, or a combination thereof.

At block 640, the processing device may receive integrity data of the trusted execution environment of the computing device. The trusted execution environment (TEE) may be established by a Central Processing Unit (CPU) of the computing device. In one example, the service may be unaware it is executing in the TEE of the computing device. In another example, the service may check to determine the service is executing in a TEE. The check may involve executing a hardware instruction that indicates the use of a TEE, which may or may not perform local attestation.

At block 650, the processing device may provide the integrity data to a consumer device associated with the service. The processing device may store, in a persistent data storage device, the integrity data of the trusted execution environment that is executing the service before, during, or after providing it to the consumer device. The processing device may provide the same stored integrity data to a plurality of consumer devices to indicate to the plurality of consumer devices that the service is executing in the trusted execution environment. Responsive to completing the operations described herein above, method 600 may terminate.

Referring to FIG. 7, method 700 may enable a computing device to execute a service in a trusted execution environment and to generate integrity data that enables another device to verify the integrity of the state of the service over time. Method 700 may begin at block 710, where a processing device may establish a trusted execution environment for a service. The trusted execution environment may include an encrypted storage area (e.g., encrypted portion of main memory). The trusted execution environment (TEE) may be established by a central processing unit (CPU) of the computing device using Software Guard Extensions (SGX), Secure Encrypted Virtualization (SEV), or a TrustZone.

At block 720, the processing device may load data of the service into the trusted execution environment. The data may include executable data (e.g., program code), non-executable data (e.g., service information, consumer data), other data, or a combination thereof. In one example, a single trusted execution environment executes both the service and an agent. The agent may be a computer program that executes as a computing process and monitors the state of the service. The service may be unaware the service or agent are executing in the trusted execution environment.

At block 730, the processing device may detect a change of the trusted execution environment that is executing the service. The processing device may detect the change by comparing integrity data of an earlier state (e.g. prior state, previous state) with integrity data of a subsequent state (e.g., current state, later state). In one example, processing device may receive a request from a broker device to perform a remote attestation (e.g., request for integrity data from the security brokerage service). The remote attestation may involve one or more local attestations, remote attestations, direct anonymous attestations (DAA), other attestation, or a combination thereof.

At block 740, the processing device may generate integrity data that represents a state of the trusted execution environment after the change. The integrity data may include attestation data and state data of the trusted execution environment. In example, the integrity data that represents the state of the trusted execution environment may include a hash chain that is based on a certificate and based on integrity data representing an earlier state of the trusted execution environment. In another example, the integrity data that represents the state of the trusted execution environment may be or include data generated by an integrity measurement architecture (IMA).

At block 750, the processing device may transfer the integrity data to another computing device. The integrity data being transferred may include one or more states of the trusted execution environment. The processing device may register the service with a security brokerage service before, during, or after providing the integrity data to the other computing device (e.g., the broker device). In one example, the trusted execution environment executes a virtual machine that includes the service and the integrity data includes a hash that represents a state of a virtual machine image of the virtual machine. In another example, the trusted execution environment executes a container that includes the service and the integrity data includes a hash that represents a state of a container image of the container. Responsive to completing the operations described herein above, method 700 may terminate.

Figure 8:
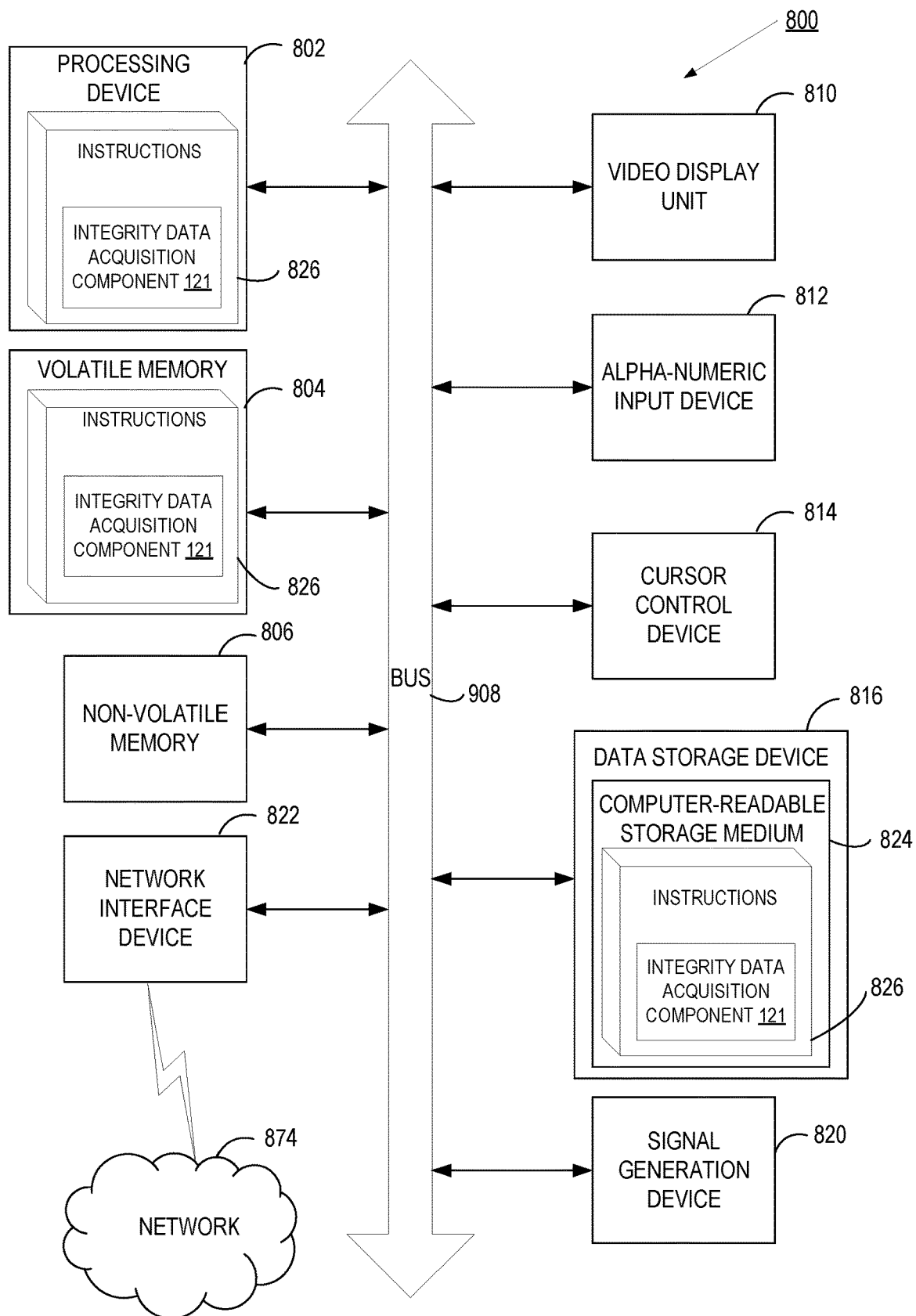
FIG. 8 depicts a block diagram of example computer system operating in accordance with the examples of the present disclosure.

FIG. 8 depicts a block diagram of a computer system operating in accordance with one or more aspects of the present disclosure. In various illustrative examples, computer system 800 may correspond to computing device 110A-Z. Computer system 800 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical environment, but requests for a hard disk or memory may be managed by a virtualization layer of a computing device to translate these requests to the underlying physical computing hardware resources. This type of virtualization results in multiple VMs sharing physical resources.

In certain implementations, computer system 800 may be connected (e.g., via a network, such as a Local Area Network (LAN), an intranet, an extranet, or the Internet) to other computer systems. Computer system 800 may operate in the capacity of a server or a client computer in a client-server environment, or as a peer computer in a peer-to-peer or distributed network environment. Computer system 800 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 800 may include a processing device 802, a volatile memory 804 (e.g., random access memory (RAM)), a non-volatile memory 806 (e.g., read-only memory (ROM) or electrically-erasable programmable ROM (EEPROM)), and a data storage device 816, which may communicate with each other via a bus 808.

Processing device 802 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 800 may further include a network interface device 822. Computer system 800 also may include a video display unit 810 (e.g., an LCD), an alphanumeric input device 812 (e.g., a keyboard), a cursor control device 814 (e.g., a mouse), and a signal generation device 820.

Data storage device 816 may include a non-transitory computer-readable storage medium 824 on which may store instructions 826 encoding any one or more of the methods or functions described herein, including instructions for implementing methods 500, 600 and 700, and for encoding integrity data acquisition component 121.

Instructions 826 may also reside, completely or partially, within volatile memory 804 and/or within processing device 802 during execution thereof by computer system 800, hence, volatile memory 804 and processing device 802 may also constitute machine-readable storage media.

While computer-readable storage medium 824 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "acquiring", "correlating," "providing," "determining," "detecting," "generating," "deriving," "encrypting," "creating," "generating," "using," "accessing," "executing," "obtaining," "storing," "transmitting," "transferring," "establishing," "loading," "causing," "performing," "executing," "configuring," "receiving," "identifying," "initiating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements (e.g., cardinal meaning) and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 500, 600 or 700 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
  acquiring, by a broker device, integrity data of a first computing device and integrity data of a second computing device, wherein the integrity data of the first computing device indicates whether a first service executes within a first trusted execution environment of the first computing device and the integrity data of the second computing device indicates whether a second service executes within a second trusted execution environment of the second computing device;
  storing, by the broker device, the integrity data of the first computing device and the integrity data of the second computing device in a data storage device as stored integrity data;

creating, by the broker device, a first unidirectional correlation between the integrity data of the first computing device and the first service, and a second unidirectional correlation between the integrity data of the second computing device and the second service; and
providing, by the broker device, the stored integrity data to a plurality of consumer devices, wherein the integrity data of the first computing device is provided to a consumer device associated with the first service and the integrity data of the second computing device is provided to a consumer device associated with the second service.

2. The method of claim 1, wherein the broker device executes a security brokering service and wherein the first service and the second service are registered with the security brokering service.

3. The method of claim 1, wherein the integrity data of the first computing device comprises attestation data of a central processing unit (CPU) comprising Software Guard Extensions (SGX) and the integrity data of the second computing device comprises attestation data of a central processing unit (CPU) comprising Secure Encrypted Virtualization (SEV).

4. The method of claim 1, wherein the acquiring comprises, the broker device initiating a remote attestation of the first computing device and a remote attestation of the second computing device, wherein the remote attestations comprise direct anonymous attestation (DAA).

5. The method of claim 1, wherein the first service and the second service are part of a service mesh, and wherein the first service communicates with the second service to satisfy requests of the plurality of consumer devices.

6. The method of claim 1, wherein the providing comprises providing to each of the plurality of consumer devices the integrity data of the first computing device together with the integrity data of the second computing device.

7. The method of claim 1, wherein the providing comprises providing to at least one of the plurality of consumer devices the integrity data of the first computing device together with integrity data of the broker device.

8. The method of claim 1, further comprising, verifying the integrity data of the first computing device using a hash function, wherein the verifying is performed by the broker device or by one of the plurality of consumer devices.

9. The method of claim 1, wherein the acquiring the integrity data of the first computing device is performed prior to receiving a request from any of the plurality of consumer devices.

10. The method of claim 1, wherein the acquiring the integrity data of the first computing device is performed in response to receiving, from a consumer device, a request to verify that the first service is executing in a trusted execution environment.

11. The method of claim 1, wherein the first computing device comprises a Trusted Computing Base (TCB) that establishes the first trusted execution environment (TEE) executing the first service, wherein the TEE provides Confidential Computing (CC) of the first service by encrypting data of the first service that is stored in main memory and is in use by the first computing device.

12. A system comprising:
a memory; and
a processing device of a broker device communicably coupled to the memory, the processing device to:
acquire integrity data of a first computing device and integrity data of a second computing device, wherein the integrity data of the first computing device indicates whether a first service executes within a first trusted execution environment of the first computing device and the integrity data of the second computing device indicates whether a second service executes within a second trusted execution environment of the second computing device;
store the integrity data of the first computing device and the integrity data of the second computing device in a data storage device as stored integrity data;
create a first unidirectional correlation between the integrity data of the first computing device and the first service and a second unidirectional correlation between the integrity data of the second computing device and the second service; and
provide the stored integrity data to a plurality of consumer devices, wherein the integrity data of the first computing device is provided to a consumer device associated with the first service and the integrity data of the second computing device is provided to a consumer device associated with the second service.

13. The system of claim 12, wherein the broker device executes a security brokering service and wherein the first service and the second service are registered with the security brokering service.

14. The system of claim 12, wherein the integrity data of the first computing device comprises attestation data of a central processing unit (CPU) comprising Software Guard Extensions (SGX) and the integrity data of the second computing device comprises attestation data of a central processing unit (CPU) comprising Secure Encrypted Virtualization (SEV).

15. The system of claim 12, wherein to acquire the integrity data, the processing device is to initiate a remote attestation of the first computing device and a remote attestation of the second computing device.

16. The system of claim 12, wherein the first service and the second service are part of a service mesh, and wherein the first service communicates with the second service to satisfy requests of the plurality of consumer devices.

17. A non-transitory machine-readable storage medium storing instructions which, when executed, cause a processing device to perform operations comprising:
acquiring, by a broker device, integrity data of a first computing device and integrity data of a second computing device, wherein the integrity data of the first computing device indicates whether a first service executes within a first trusted execution environment of the first computing device and the integrity data of the second computing device indicates whether a second service executes within a second trusted execution environment of the second computing device;
storing, by the broker device, the integrity data of the first computing device and the integrity data of the second computing device;
create, by the broker device, a first unidirectional correlation between the integrity data of the first computing device and the first service and a second unidirectional correlation between the integrity data of the second computing device and the second service to produce combined integrity data; and
providing, by the broker device, the combined integrity data to a plurality of consumer devices, wherein the combined integrity data is provided to a consumer device associated with the first service and the integrity data of the second computing device is provided to a consumer device associated with the second service.

18. The non-transitory machine-readable storage medium of claim 17, wherein the providing comprises providing to at least one of the plurality of consumer devices the combined integrity data together with integrity data of the broker device.

19. The non-transitory machine-readable storage medium of claim 17, wherein the acquiring the integrity data is performed prior to receiving a request from any of the plurality of consumer devices.

20. The non-transitory machine-readable storage medium of claim 17, wherein the acquiring the integrity data is performed in response to receiving requests to verify services are executing in trusted execution environments.

* * * * *